United States Patent [19]

Dorricott et al.

[11] Patent Number: 5,526,053
[45] Date of Patent: Jun. 11, 1996

[54] MOTION COMPENSATED VIDEO SIGNAL PROCESSING

[75] Inventors: Martin R. Dorricott, Basingstoke; Morgan W. A. David, Farnham; Shima R. Varsani, Winscombe, all of United Kingdom

[73] Assignees: Sony Corporation, Tokyo, Japan; Sony United Kingdom Limited, Weybridge, England

[21] Appl. No.: 317,485

[22] Filed: Oct. 4, 1994

[30] Foreign Application Priority Data

Oct. 26, 1993 [GB] United Kingdom ............... 9322052

[51] Int. Cl.⁶ ............................................ H04N 7/01
[52] U.S. Cl. ........................ 348/443; 348/699; 348/700
[58] Field of Search ............................ 348/441, 443, 348/445, 446, 448, 451, 452, 458, 459, 699; H04N 7/01, 5/14

[56] References Cited

U.S. PATENT DOCUMENTS 5,060,064  10/1991  Lamnabhi et al. ............... 348/443
5,162,907  11/1992  Keating et al. ................... 348/699
5,347,312  9/1994   Saunders ......................... 348/443

FOREIGN PATENT DOCUMENTS 2231749  11/1990  United Kingdom.
2265065  9/1993   United Kingdom.

*Primary Examiner*—Safet Metjahic
*Assistant Examiner*—Michael H. Lee
*Attorney, Agent, or Firm*—William S. Frommer; Alvin Sinderbrand

[57] ABSTRACT

Motion compensated video signal processing apparatus for interpolating an output image of an output video signal from a corresponding pair of temporally adjacent input images of an input video signal comprises: means for generating a plurality of local motion vectors to represent image motion of respective search blocks of one input image of the pair between that image and the other image of the pair; means for detecting blocks of the output image pointed to by each local motion vector; means for assigning a group of motion vectors to each block of the output image, the group being selected from a set of motion vectors comprising at least those local motion vectors pointing to that block of the output image; and a motion compensated interpolator for interpolating pixels of each block of the output image from the pair of input images, using a motion vector from the group assigned to that block.

10 Claims, 18 Drawing Sheets

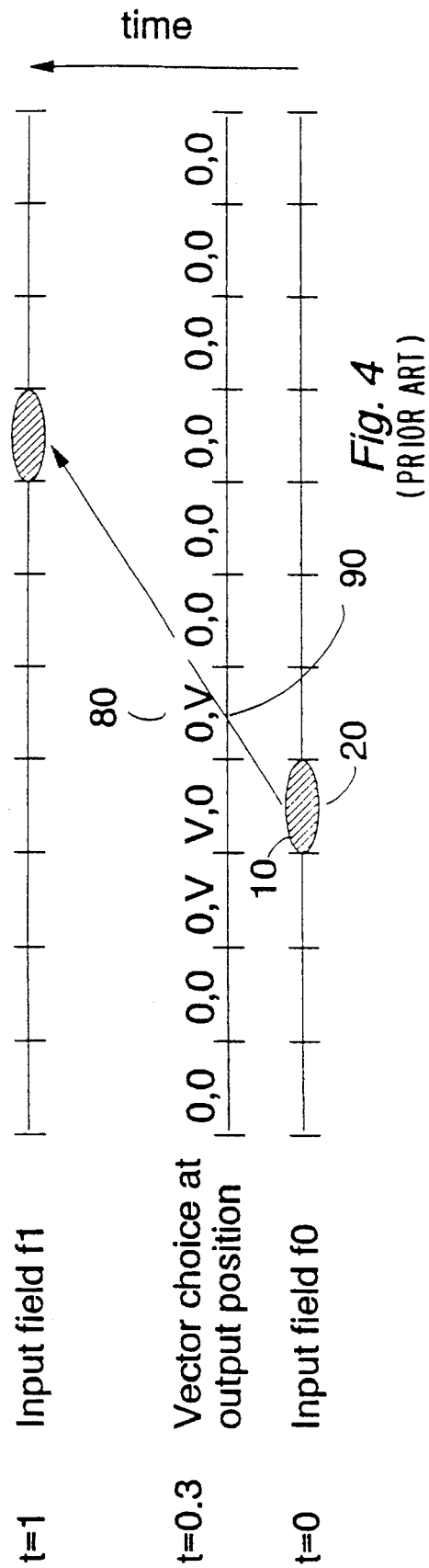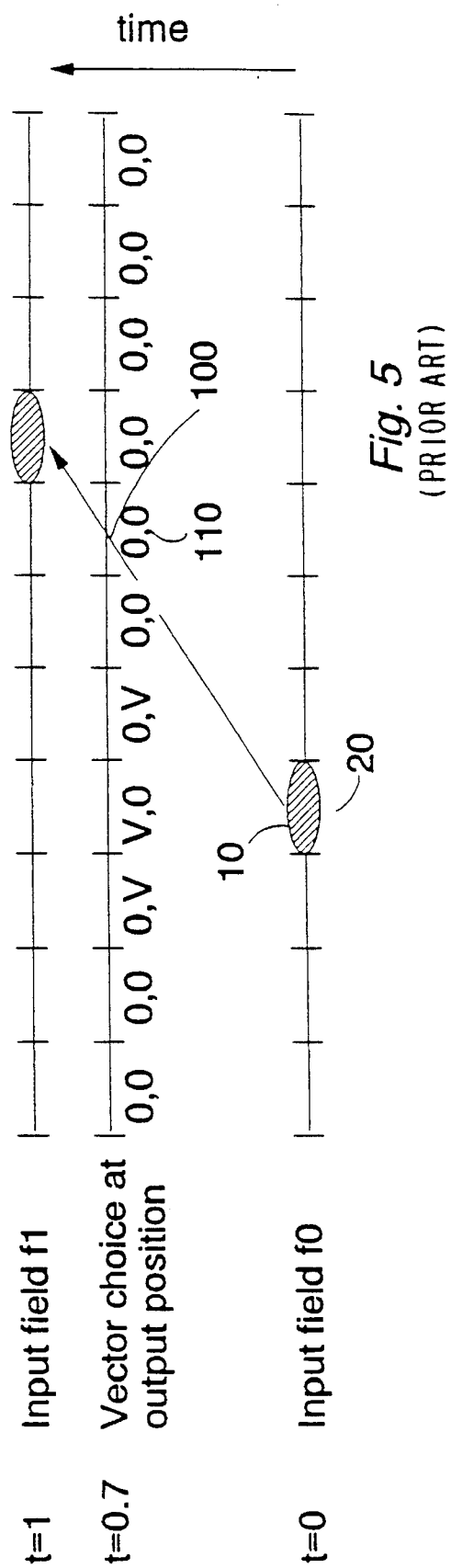

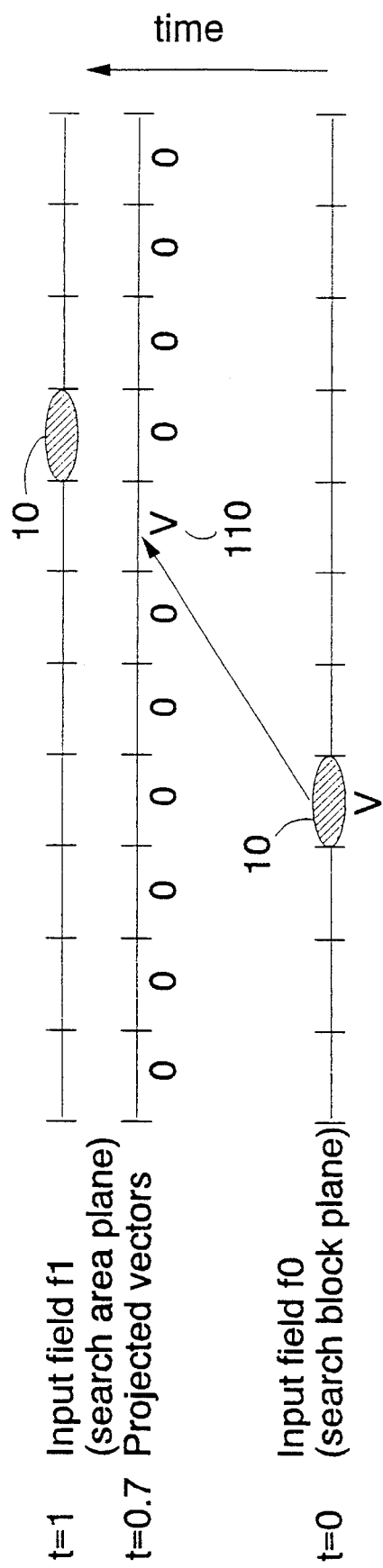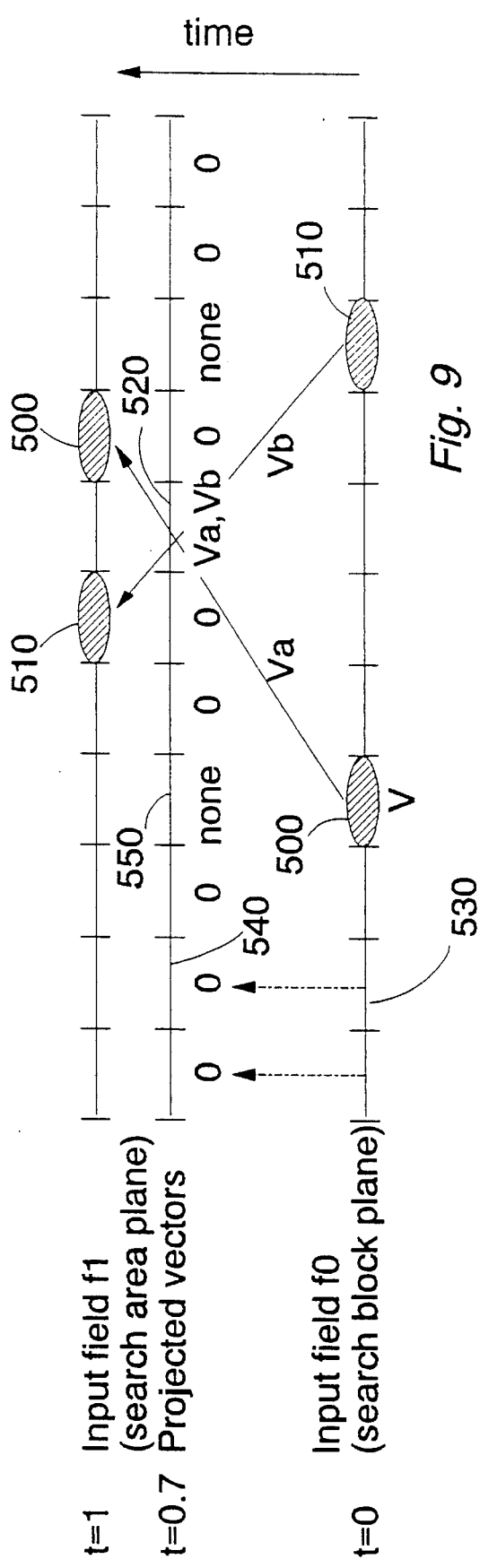

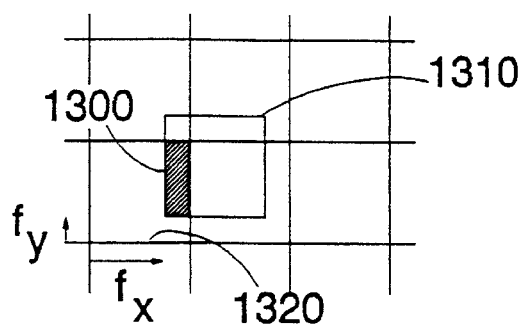
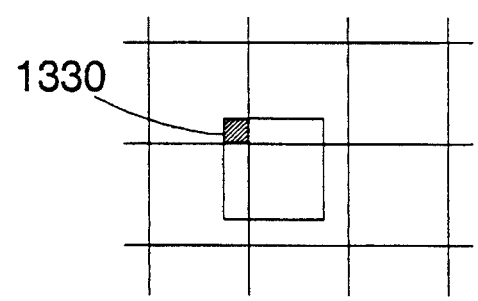
Fig. 22                                   Fig. 23
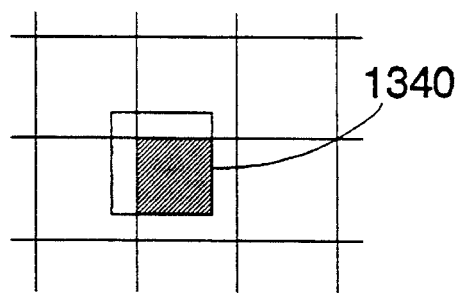
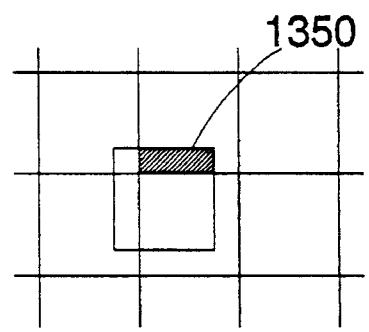
Fig. 24                                   Fig. 25

MOTION COMPENSATED VIDEO SIGNAL PROCESSING

BACKGROUND OF THE INVENTION

1. Field of the Invention

This invention relates to motion compensated video signal processing.

2. Description of the Prior Art

Motion compensated video signal processing is used in video processing applications such as television standards conversion or video to film conversion. An example of a previously proposed motion compensated video processing apparatus is described in the British Published Patent Application number GB-A-2 231 749, in which pairs of temporally adjacent images (fields or frames) of an input digital video signal are processed to generate corresponding sets of motion vectors. The processing is carried out on discrete blocks of the images, so that each motion vector represents the inter-image motion of the contents of a respective block. After further processing, the set of motion vectors is supplied to a motion compensated interpolator which interpolates an output image from the pair of input images, taking into account the motion between the input images.

In the above apparatus the motion vectors are generated as follows. The first stage is that individual search blocks within the input image temporally preceding a required output image are compared with a plurality of such blocks in a search area of the input image temporally following that output image. For each such comparison a correlation test is performed involving the calculation of the absolute luminance difference between pixels in corresponding positions in the respective blocks in the temporally preceding and temporally following input images. These absolute luminance differences are then summed to generate a correlation value indicative of the correlation between the two blocks being compared. The block in the search area of the temporally following image for which the correlation value is lowest is taken to be correlated with the search block in the temporally preceding image, and a motion vector is generated representing image motion from the search block to that block in the search area.

A problem which can occur with previously proposed motion compensated video signal processing apparatus will now be described with reference to FIGS. 1 to 5 of the accompanying drawings.

FIG. 1 is a one-dimensional view of an object 10 moving at a velocity V between two consecutive fields (f0, f1) of an input video signal. As described above, the input field f0 is arbitrarily divided into a grid of search blocks (e.g. the blocks 20, 30 shown in FIG. 1) and each search block is compared with a respective search area 40 comprising a plurality of such blocks, in the input field f1. A motion vector 50 is generated in dependence on the position in the search area 40 having the highest correlation with (i.e. the least difference from) the search block 20.

FIG. 2 illustrates an array of motion vectors generated from the search blocks of the input field f0 of FIG. 1. In this example, a motion vector V is generated from the search block 20, to represent the motion of the object 10 between the input f0 and the input field f1. Surrounding search blocks in the input field f0 do not contain moving objects and so a zero motion vector is generated from those search blocks.

A vector reduction process is employed to assign a group of motion vectors to each of a plurality of blocks of an output field (corresponding in positions to respective search blocks of the input field f0). This group of motion vectors is selected from, in the following order of preference, 1. The zero motion vector;
2. The motion vector generated from the corresponding search block of the input field f0 (the "local" motion vector); motion vectors generated from surrounding search blocks of the input field f0 ("neighbouring" motion vectors); and
4. A predetermined number of most frequently occurring distinct motion vectors from the entire input field f0 ("global" motion vectors).

Each pixel of each block of the output field is interpolated from the two input fields using one of the motion vectors from the group assigned to that block of the output field.

In the previously proposed apparatus described above, groups of four motion vectors are assigned to each block of the output image by the vector reduction process. In order to simplify the following explanation, however, FIG. 3 shows a case in which groups of two motion vectors are assigned to the blocks of the output image. A block 60 (corresponding in position to the search block 20 of the input field f0) is assigned the motion vectors V and zero. The motion vector V is also assigned (as a "neighbouring" motion vector) to the immediately adjacent blocks 70, 80 of the output image. The remaining blocks of the output image are not assigned the motion vector V.

FIG. 4 illustrates the interpolation of the output image when the temporal position of the output image is three tenths of the way between the input field f0 and the input field f1. In other words, if the input field f0 is considered to occur at a time t=0 and the input field f1 at a time t=1, then the output field occurs at t=0.3.

In order to represent the motion of the object 10, the object 10 should be interpolated at a position 90 in the output field. The position 90 falls within the block 80 of the output field for which the motion vector V was assigned during vector reduction. The object 10 can therefore be correctly interpolated using the motion vector V.

In contrast, FIG. 5 illustrates the interpolation of an output field at a temporal position t=0.7. In this case, the position 100 at which the object 10 should be interpolated falls within a block 110 of the output field for which the motion vector V has not been assigned. The object 10 cannot be correctly interpolated in the output field because the motion vector V is not available for its interpolation.

Accordingly, despite the use of vector reduction which allows blocks of the outputs fields to "borrow" more suitable motion vectors from other blocks, situations (such as that illustrated in FIG. 5) can arise in which the motion vector required for correct interpolation of a portion of the output field is not made available by vector reduction. This can be a particular problem for objects moving rapidly between two consecutive input fields, in which case the motion vector representing that motion may be significantly larger than the size of the search block.

SUMMARY OF THE INVENTION

It is an object of the invention to provide an improved apparatus and method for motion compensated video signal processing.

This invention provides a motion compensated video signal processing apparatus for interpolating an output image of an output video signal from a corresponding pair of temporally adjacent input images of an input video signal, the video signal processing apparatus comprising: means for generating a plurality of local motion vectors to represent image motion of respective search blocks of one input image of the pair between that image and the other image of the pair; means for detecting blocks of the output image pointed to by each local motion vector; means for assigning a group of motion vectors to each block of the output image, the group being selected from a set of motion vectors comprising at least those local motion vectors pointing to that block of the output image; and a motion compensated interpolator for interpolating pixels of each block of the output image from the pair of input images, using a motion vector from the group assigned to that block.

In accordance with the invention, each motion vector is assigned to blocks of the output image which are pointed to by that motion vector. This can avoid the problems outlined above in which the appropriate motion vector was not available for use in interpolation of the part of the image to which the motion vector referred.

Preferably, in order to present a choice of motion vectors for use in interpolation and to cater for the situation in which no motion vectors point to a particular block, the set of motion vectors for each block of the output image comprises the local motion vector for a corresponding search block.

In order to assign the most suitable motion vectors to each block of the output image, it is preferred that the means for assigning comprises: means for deriving likelihood values for each block of the output image, the likelihood values for each block being indicative of the suitability of each motion vector in the respective set of motion vectors for use in interpolation of pixels of that block; and means for detecting a predetermined number of motion vectors having the highest likelihood values from the respective set of motion vectors for each block of the output image.

Preferably, for each block of the output image, the local motion vector for a corresponding search block has a likelihood value equal to a predetermined constant value.

In a preferred embodiment, for each block of the output image, the likelihood value for a local motion vector pointing to that block is proportional to the area of intersection between that block and the search block corresponding to that motion vector projected in the direction of that motion vector.

In order to provide a suitable motion vector in cases where, for example, a moving object slightly overlaps adjacent blocks, it is preferred that the set of motion vectors for each block of the output image comprises those local motion vectors pointing to blocks of the output image adjacent to that block of the output image.

In this case it is preferred that, for each block of the output image, the likelihood value for a local motion vector pointing to an adjacent block of the output image is proportional to an area of intersection between the first mentioned block of the output image and a search block corresponding to the motion vector projected in the direction of the motion vector.

It is preferred that, for each block of the output image, the likelihood value for a local motion vector pointing to an adjacent block of the output image is dependent on the direction of the motion vector.

Preferably the apparatus comprises means for deriving global motion vectors comprising a plurality of distinct motion vectors selected from the most common of the plurality of local motion vectors. In this case, in order that the global motion vectors can contribute to the interpolation process, it is preferred that the set of motion vectors for each block of the output image comprises the global motion vectors.

However, in order to avoid a global motion vector being assigned to blocks representing parts of the output image unrelated to the motion of the global motion vector, it is preferred that the apparatus comprises means for deriving a global vector mask for each global motion vector, the mask for each global motion vector being indicative of blocks of the output image for which the corresponding search block has a local motion vector within a predetermined tolerance of that global motion vector. Further, it is preferred that, for each block of the output image, the likelihood value for each global motion vector is dependent on the respective global vector mask.

In a preferred embodiment, the apparatus comprises means for detecting whether one or more of the global motion vectors is substantially equal to at least a predetermined proportion of the local motion vectors, thereby detecting a panning motion of the input images. In this case, greater weight can be given to the global motion vectors in the assigning process. In particular, it is preferred that, for each block of the output image, the likelihood value for each global motion vector is dependent on whether a panning motion of the input images is detected.

Again, in order to increase the choice of motion vectors available for interpolation, it is preferred that the means for assigning is operable to assign the zero motion vector to each block of the output image. This means that if no other suitable motion vector can be found, the performance of the apparatus is no worse than that of a non-motion compensated apparatus.

Preferably the apparatus comprises means for selecting a motion vector for use in interpolation of each pixel of the output image, the means for selecting comprising means for detecting the degree of correlation between test blocks of the input images pointed to by each motion vector in the group assigned to that output image; and means for selecting a motion vector from the group of motion vectors having the highest degree of correlation between the respective test blocks.

Although the invention is suitable for use with various formats of input and output video signals, it is preferred that the input images comprise successive fields of an input interlaced video signal. It is also preferred that the output image comprises a field of an output interlaced video signal.

Apparatus according to the invention may advantageously be employed in a television standards conversion apparatus.

Viewed from a second aspect this invention provides a method of motion compensated video signal processing, in which an output image of an output video signal is interpolated from a corresponding pair of temporally adjacent input images of an input video signal, the method comprising the steps of: generating a plurality of local motion vectors to represent image motion of respective search blocks of one input image of the pair between that image and the other image of the pair; detecting blocks of the output image pointed to by each local motion vector; assigning a group of motion vectors to each block of the output image, the group being selected from a set of motion vectors comprising at least those local motion vectors pointing to that block of the output image; and interpolating pixels of each block of the output image from the pair of input images, using a motion vector from the group assigned to that block.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 4 illustrates the interpolation of an output field at a temporal position three tenths of the way between two input fields;

FIG. 5 illustrates the interpolation of an output field at a temporal position seven tenths of the way between two input fields;

FIG. 8 illustrates the projection of motion vectors;

FIG. 9 illustrates the projection of motion vectors where one block of an output field is intersected by two or more projected motion vectors;

FIGS. 22 to 26 illustrate the operations shown in FIG. 21; and

DESCRIPTION OF THE PREFERRED EMBODIMENTS

Figure 1:
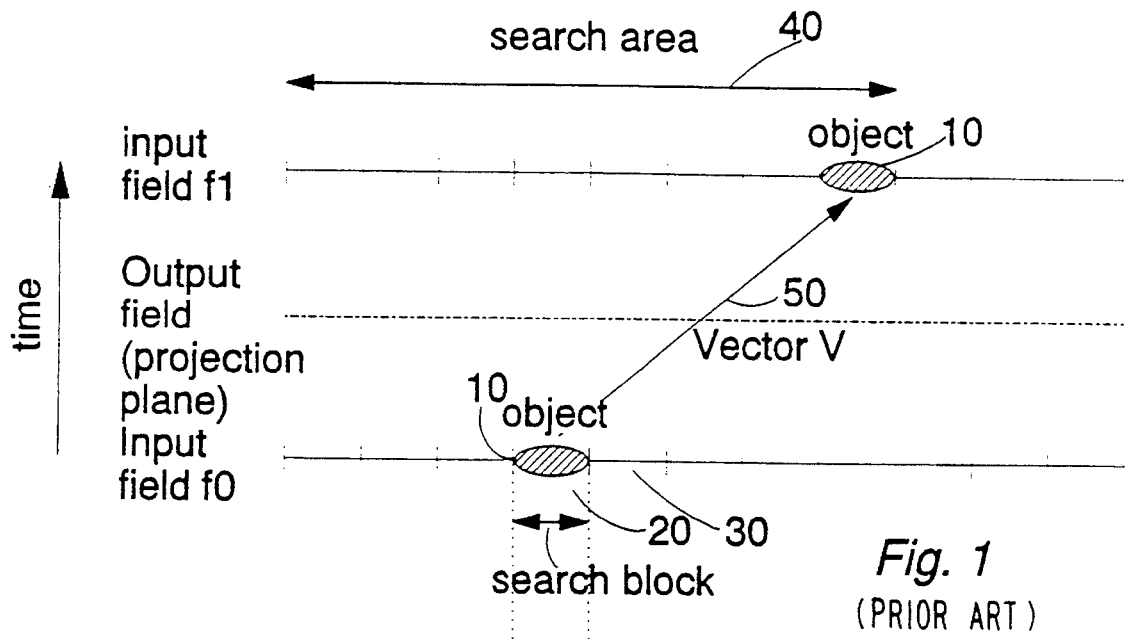
FIG. 1 is a one-dimensional view of an object moving between two consecutive fields of an input video signal.
Figure 2:
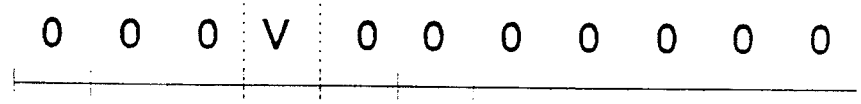
FIG. 2 illustrates an array of motion vectors generated from the input fields of FIG. 1.
Figure 3:
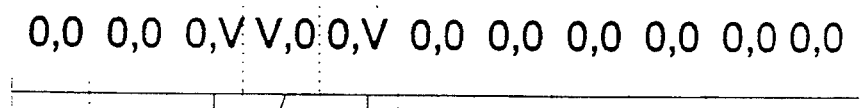
FIG. 3 illustrates the assignment of groups of motion vectors to blocks of an output field.
Figure 6:
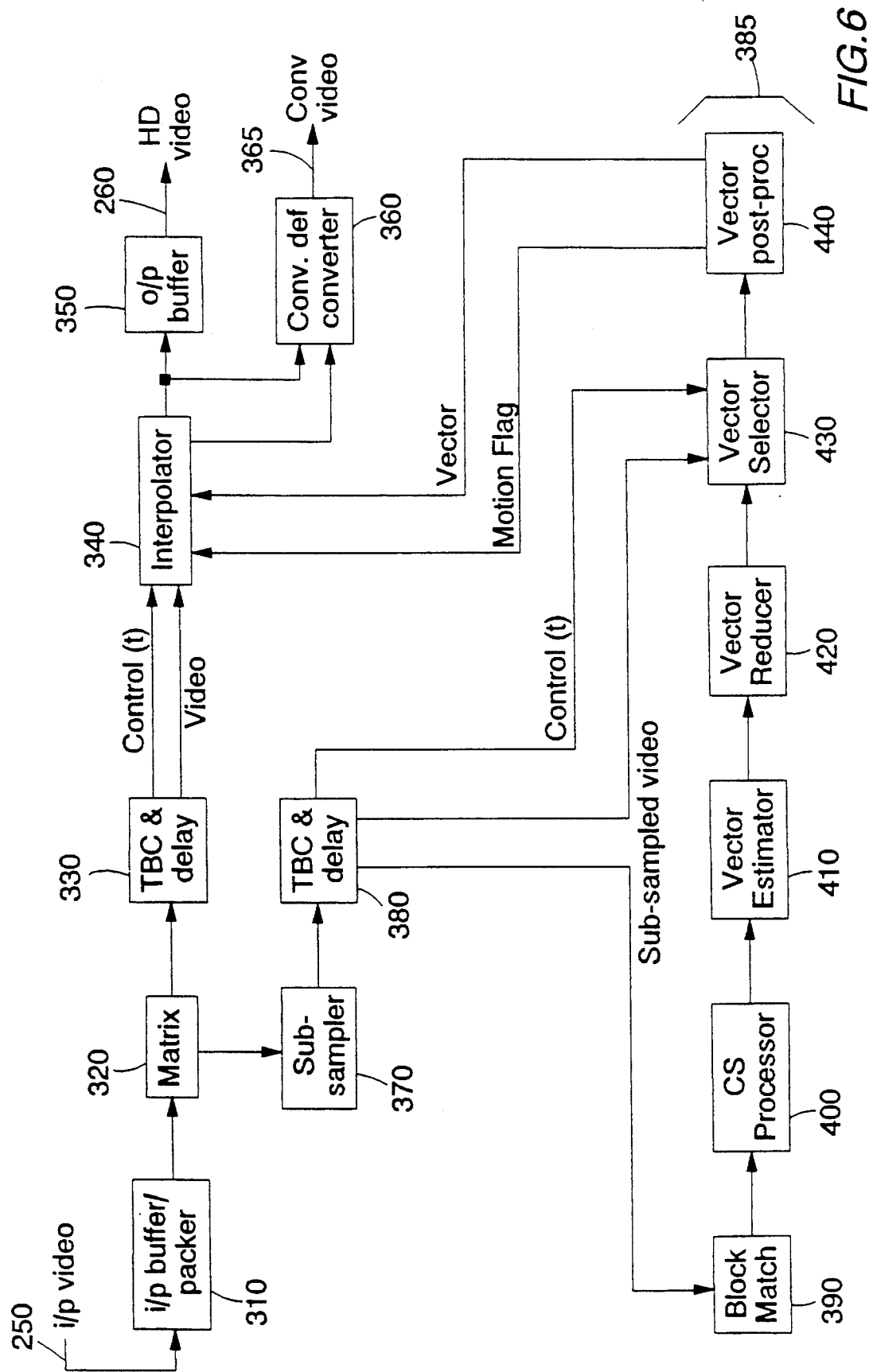
FIG. 6 is a schematic block diagram of a motion compensated television standards conversion apparatus.

FIG. 6 is a schematic block diagram of a motion compensated television standards conversion apparatus. The apparatus receives an input interlaced digital video signal 250 (e.g. an 1125/60 2:1 high definition video signal (HDVS)) and generates an output interlaced digital video signal 260 (e.g. a 1250/50 2:1 signal).

The input video signal 250 is first supplied to an input buffer/packer 310. In the case of a conventional definition input signal, the input buffer/packer 310 formats the image data into a high definition (16:9 aspect ratio) format, padding with black pixels where necessary. For a HDVS input the input buffer/packer 310 merely provides buffering of the data.

The data are passed from the input buffer/packer 310 to a matrix circuit 320 in which (if necessary) the input video signal's colorimetry is converted to the colorimetry of the desired output signal, such as the standard "CCIR recommendation 601" (Y,Cr,Cb) colorimetry.

From the matrix circuit 320 the input video signal is passed to a time base changer and delay 330, and via a sub-sampler 370 to a subsampled time base changer and delay 380. The time base changer and delay 330 determines the temporal position of each field of the output video signal, and selects the two fields of the input video signal which are temporally closest to that output field for use in interpolating that output field. For each field of the output video signal, the two input fields selected by the time base changer are appropriately delayed before being supplied to an interpolator 340 in which that output field is interpolated. A control signal t, indicating the temporal position of each output field with respect to the two selected input fields, is supplied from the time base changer and delay 330 to the interpolator 340.

The subsampled time base changer and delay 380 operates in a similar manner, but using spatially subsampled video supplied by the subsampler 370. Pairs of fields, corresponding to the pairs selected by the time base changer 330, are selected by the subsampled time base changer and delay 380 from the subsampled video, to be used in the generation of motion vectors.

The time base changers 330 and 380 can operate according to synchronisation signals associated with the input video signal, the output video signal, or both. In the case in which only one synchronisation signal is supplied, the timing of fields of the other of the two video signals is generated deterministically within the time base changers 330, 380.

The pairs of fields of the subsampled input video signal selected by the subsampled time base changer and delay 380 are supplied to a motion processor 385 comprising a direct block marcher 390, a correlation surface processor 400, a motion vector estimator 410, a motion vector reducer 420, a motion vector selector 430 and a motion vector post-processor 440. The pairs of input fields are supplied first to the direct block marcher 390 which calculates correlation surfaces representing the spatial correlation between search blocks in the temporally earlier of the two selected input fields and (larger) search areas in the temporally later of the two input fields.

From the correlation surfaces output by the block matcher 390, the correlation surface processor 400 generates a larger number of interpolated correlation surfaces, which are then passed to the motion vector estimator 410. The motion vector estimator 410 detects points of greatest correlation in the interpolated correlation surfaces. (The original correlation surfaces actually represent the difference between blocks of the two input fields; this means that the points of maximum correlation are in fact minima on the correlation surfaces, and are referred to as "minima"). In order to detect a minimum, additional points on the correlation surfaces are interpolated, providing a degree of compensation for the loss of resolution caused by the use of subsampled video to generate the surfaces. From the detected minimum on each correlation surface, the motion vector estimator 410 generates a motion vector which is supplied to the motion vector reducer 420.

The motion vector estimator 410 also performs a confidence test on each generated motion vector to establish whether that motion vector is significant above the average data level, and associates a confidence flag with each motion vector indicative of the result of the confidence test. The confidence test, known as the "threshold" test, is described (along with certain other features of the apparatus of FIG. 6) in GB-A-2 231 749.

A test is also performed by the motion vector estimator 410 to detect whether each vector is potentially aliased. In this test, the correlation surface (apart from an exclusion zone around the detected minimum) is examined to detect the next lowest minimum. If this second minimum does not lie at the edge of the exclusion zone, the motion vector derived from the original minimum is flagged as being potentially aliased.

The motion vector reducer 420 operates to reduce the choice of possible motion vectors for each pixel of the output field, before the motion vectors are supplied to the motion vector selector 430. The output field is notionally divided into blocks of pixels, each block having a corresponding position in the output field to that of a search block in the earlier of the selected input fields. The motion vector seducer compiles a group of four motion vectors to be associated with each block of the output field, with each pixel in that block eventually being interpolated using a selected one of that group of four motion vectors.

Vectors which have been flagged as "aliased" are re-qualified during vector reduction if they are substantially identical to non-flagged vectors in nearby blocks.

As part of its function, the motion vector reducer 420 counts the frequencies of occurrence of "good" motion vectors (i.e. motion vectors which pass the confidence test and the alias test, or which were requalified as non-aliased), with no account taken of the position of the blocks of the input fields used to obtain those motion vectors. The good motion vectors are then ranked in order of decreasing frequency. The eight most common of the good motion vectors which are significantly different to one another are then classed as "global" motion vectors.

Three motion vectors which pass the confidence test are then selected for each block of output pixels and are supplied, with the zero motion vector, to the motion vector selector 430 for further processing. The way in which the three motion vectors are chosen for each block of the output field will be described in greater detail below.

The motion vector selector 430 also receives as inputs the two input fields which were selected by the subsampled time base changer and delay 380 and which were used to calculate the motion vectors. These fields are suitably delayed so that they are supplied to the motion vector selector 430 at the same time as the vectors derived from them. The motion vector selector 430 supplies an output comprising one motion vector per pixel of the output field. This motion vector is selected from the four motion vectors for that block supplied by the motion vector reducer 420.

The vector selection process involves detecting the degree of correlation between test blocks of the two input fields pointed to by a motion vector under test. The motion vector having the greatest degree of correlation between the test blocks is selected for use in interpolation of the output pixel. A "motion flag" is also generated by the vector selector. This flag is set to "static" (no motion) if the degree of correlation between blocks pointed to by the zero motion vector is greater than a preset threshold.

The vector post-processor 440 reformats the motion vectors selected by the motion vector selector 430 to reflect any vertical or horizontal scaling of the picture, and supplies the reformatted vectors to the interpolator 340. Using the motion vectors, the interpolator 340 interpolates an output field from the corresponding two (non-subsampled) interlaced input fields selected by the time base changer and delay 330, taking into account any image motion indicated by the motion vectors currently supplied to the interpolator 340.

If the motion flag indicates that the current output pixel lies in a moving or temporally changing part of the image, pixels from the two selected fields supplied to the interpolator are combined in relative proportions depending on the temporal position of the output field with respect to the two input fields (as indicated by the control signal t), so that a larger proportion of the nearer input field is used. If the motion flag is set to "static" then the temporal weighting is fixed at 50% of each input field. The output of the interpolator 340 is passed to an output buffer 350 for output as a high definition output signal, and to a conventional definition converter (down-converter) 360 which generates a conventional definition output signal 365, using the motion flag.

The conventional definition converter 360 allows a representation of the output of the apparatus (which may be, for example, a high definition video signal) to be monitored, transmitted and/or recorded using conventional definition apparatus. This has benefits because conventional definition recording equipment is significantly cheaper and very much more widespread than high definition equipment. For example, a simultaneous output of conventional and high definition video may be required for respective transmission by terrestrial and satellite channels.

The subsampler 370 performs horizontal and vertical spatial subsampling of the input video fields received from the matrix 320, before those input fields are supplied to the time base changer 380. Horizontal subsampling is a straightforward operation in that the input fields are first prefiltered by a half-bandwidth low pass filter (in the present case of 2:1 horizontal decimation) and alternate video samples along each video line are then discarded, thereby reducing by one half the number of samples along each video line.

Vertical subsampling of the input fields is complicated by the fact that, in this embodiment, the input video signal 250 is interlaced. This means that successive lines of video samples in each interlaced field are effectively two video lines apart, and that the lines in each field are vertically displaced from those in the preceding or following field by one video line of the complete frame.

One approach to vertical subsampling would be to perform progressive scan conversion (to generate successive progressively scanned video frames each having 1125 lines) and then to subsample the progressively scanned frames by a factor of 2 to perform the vertical subsampling. However, efficient progressive scan conversion would require a degree of motion compensated processing, which processing could adversely affect the operation of the motion processor 385. Furthermore, real-time progressive scan conversion of a high definition video signal would require particularly powerful and complex processing apparatus.

Figure 7:
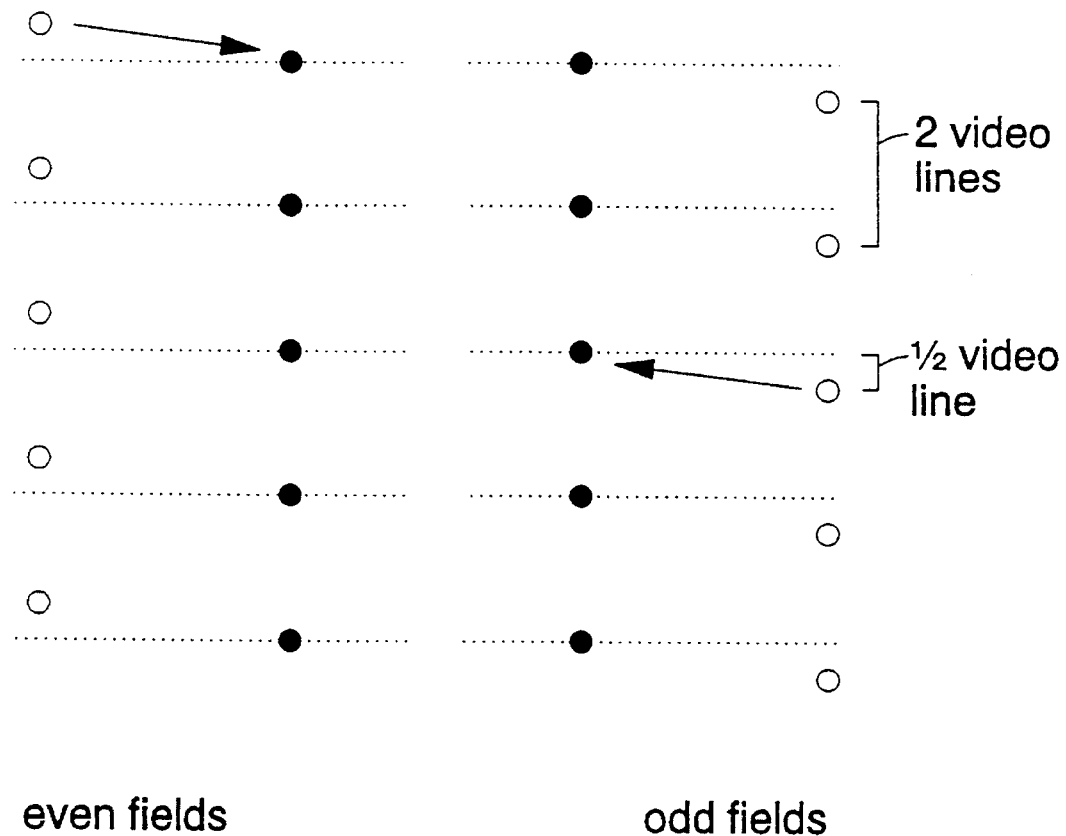
FIG. 7 schematically illustrates vertical subsampling of an interlaced field.

A simpler approach to vertical spatial subsampling is shown in FIG. 7, in which the input fields are first low pass filtered in the vertical direction (to reduce potential aliasing) and a filtering operation is then performed which effectively displaces each pixel vertically by half a video line downwards (for even fields) or upwards (for odd fields). The resulting displaced fields are broadly equivalent to progressively scanned frames which have been subsampled vertically by a factor of two.

In summary, therefore, the result of the subsampling operations described above is that the motion processor 385 operates on pairs of input fields which are spatially subsampled by a factor of two in the horizontal and the vertical directions. This reduces the processing required for motion vector estimation by a factor of four.

The operation of the motion vector reducer 420 will now be described.

In the vector reducer 420, motion vectors are projected along their vector direction to intersect the output field, and are offered to vector selection at their projected positions. An example of this process is illustrated in FIG. 8, in which the motion vector V is projected to a block 110 of the output image. Thus, when pixels of the block 110 are interpolated to represent the motion of the object 10 between the input field f0 and the input field f1, the correct motion vector (V) is available for use in the interpolation.

FIG. 9 is similar to FIG. 8 but illustrates the case in which the projection of motion vectors results in more than one motion vector being made available for a particular block of the output field. In FIG. 9, an object 500 has an associated motion vector Va, and an object 510 has an associated motion vector Vb. Projection of the motion vectors Va and Vb along the respective vector directions leads to a block 520 of the output field being assigned both of the motion vectors Va and Vb. The appropriate motion vector for use in interpolation of each pixel of that block is then established by the vector selector.

FIG. 9 also illustrates the projection of the zero motion vector e.g. from a block 530 of the input field f0 to a block 540 of the output field (the block 540 being at a position corresponding to that of the block 530).

Blocks of the output field such as the block 550 may have no motion vectors projected to that block position. In order to assign one or more motion vectors to blocks such as the block 550, the modified vector reduction process can assign motion vectors projected to neighbouring blocks of the output field.

The vector reduction process using the projection of motion vectors is described below.

Figure 10:
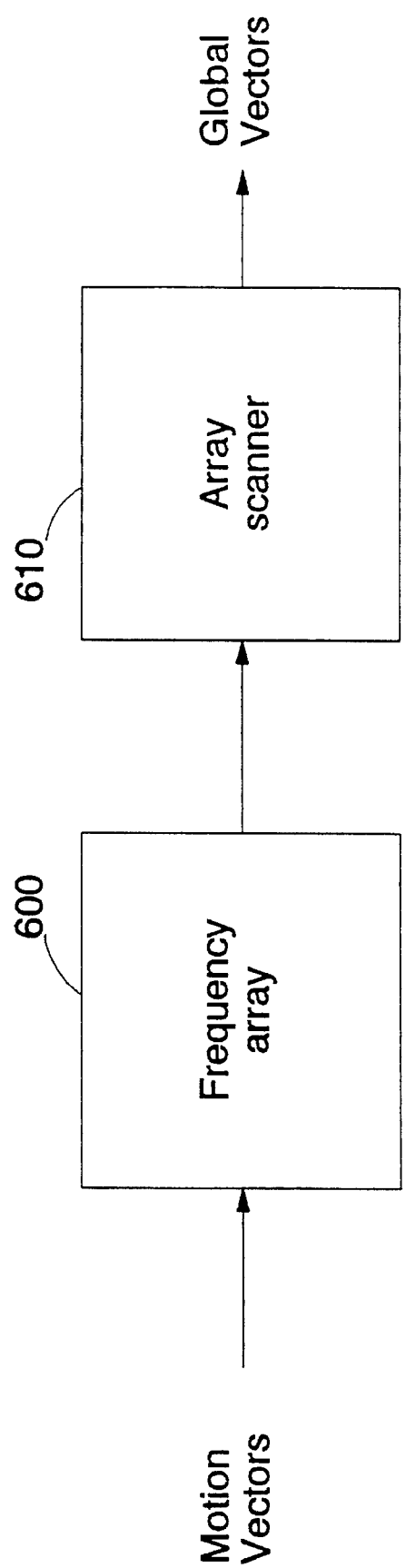
FIG. 10 illustrates a part of a motion vector reducer for detecting global motion vectors.

FIG. 10 illustrates a part of the motion vector reducer 420 in which the most common, or global, motion vectors are detected. In FIG. 10, all of the motion vectors generated from a particular pair of input fields are first passed to a frequency array 600. The frequency array 600 comprises an array of memory locations, each of which stores a respective frequency value. The address of each memory location is equal to the respective horizontal and vertical components of each possible value of the motion vectors. As each motion vector is received, the frequency value at the corresponding memory location is incremented.

When frequency values for all of the motion vectors have been stored in the frequency array 600, the frequency array is scanned by an array scanner 610. The array scanner 610 detects the eight most commonly occurring motion vectors, which are different by at least a predetermined amount, from the ensemble of motion vectors generated for that particular pair of input fields. These eight most commonly occurring motion vectors are termed "global" motion vectors and are output by the apparatus of FIG. 10 for further processing.

Figure 11:
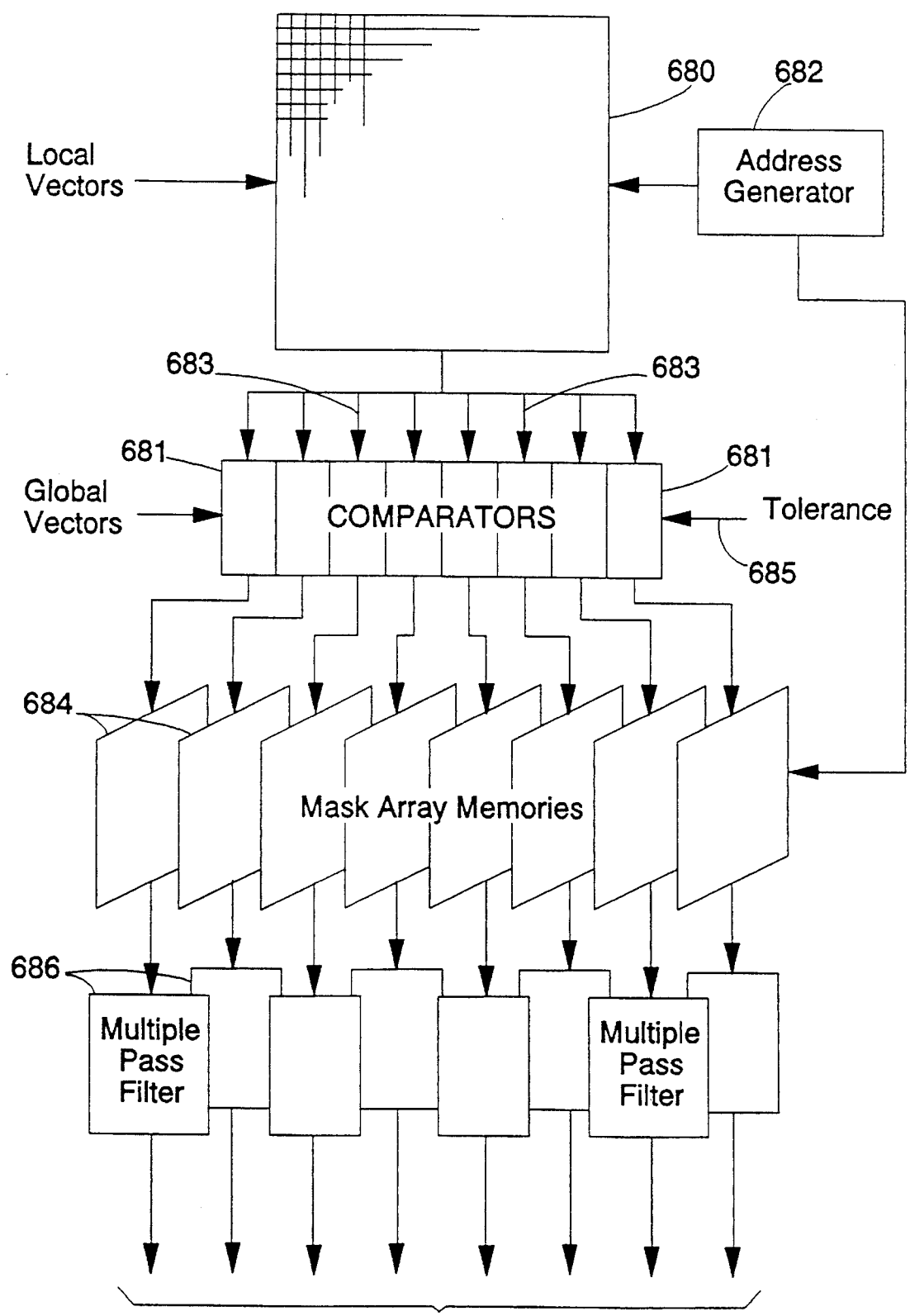
FIG. 11 is a schematic block diagram of a global vector mask generator.

FIG. 11 is a schematic block diagram of a global vector mask generator, again forming part of the motion vector reducer 420.

Referring to FIG. 11, the local motion vectors generated from respective search blocks, and associated confidence flags, are stored in a vector array memory 680. Each local vector is stored at a position in the array memory 680 corresponding to the position of the associated search block in the first of the pair of input fields from which the local vectors were derived.

At the same time, each of the eight global vectors derived by the global vector detector of FIG. 10 is supplied to one input of a respective one of eight comparators indicated schematically at 681. (In fact, each of the eight global vectors may be stored in a respective global vector store, the content of which is read repeatedly and supplied to an input of the corresponding comparator 681 as required.)

Under control of an address generator 682, the local motion vectors are read in turn from successive locations in the vector array 680, and as each local vector is read out, it is supplied to a second input 683 of each of the eight comparators 681. The comparators 681 then simultaneously compare the local motion vector with each of the eight global motion vectors supplied to the first inputs of the comparators.

The output of each of the comparators 681 controls a corresponding mask array memory 684 which is also addressed by the address generator 682. In each comparator 681, if the global motion vector is within a predetermined tolerance 685 of the local motion vector currently supplied to the comparator, then the comparator 681 sets a mask bit to "1" at a position in the corresponding mask array memory 684 corresponding to the position of the local motion vector in the vector array 680. If the global vector is not within the predetermined tolerance 685 of the local motion vector, then the comparator 681 sets the mask bit to "0" A typical value for the tolerance 685 supplied to the comparators 681 may be, for example, ±1 pixel horizontally and vertically.

Thus, as each of the local motion vectors is read out in turn from the vector array 680, a mask bit is set in each of the mask array memories 684 to indicate whether or not that local motion vector is identical or similar to the global motion vector to which each mask array memory 684 corresponds. The position of the mask bit set as a result of comparison of a given local motion vector corresponds to the position of that vector in the vector array 680, and thus to the position in the original input image of the block to which the local vector corresponds. As this is repeated for all the local vectors for the input image, a global mask array, or bit field, is built up in each array memory 684, each global mask array indicating an association, or correspondence, between the global motion vector and blocks of the original input image.

Figure 12:
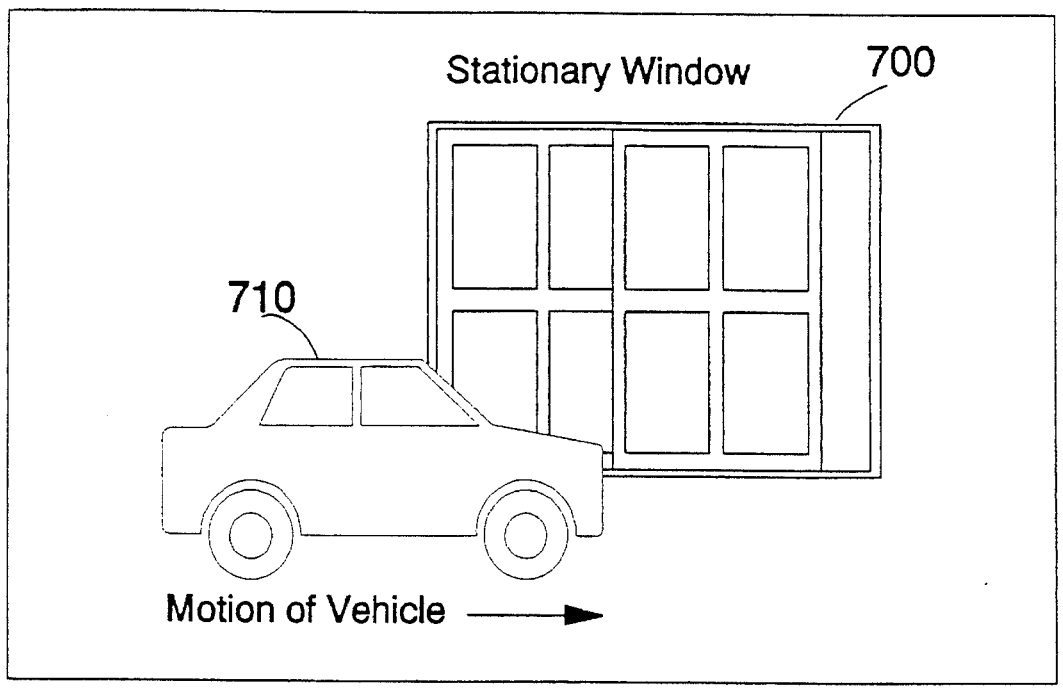
FIG. 12 is a schematic diagram of a part of an image.

FIG. 12 is a schematic diagram of part of an image containing a stationary object (a window 700) and a moving object (a moving vehicle 710). A schematic representation of a global mask array for the motion vector representing motion of the vehicle 710 is shown in FIG. 13.

Figure 13:
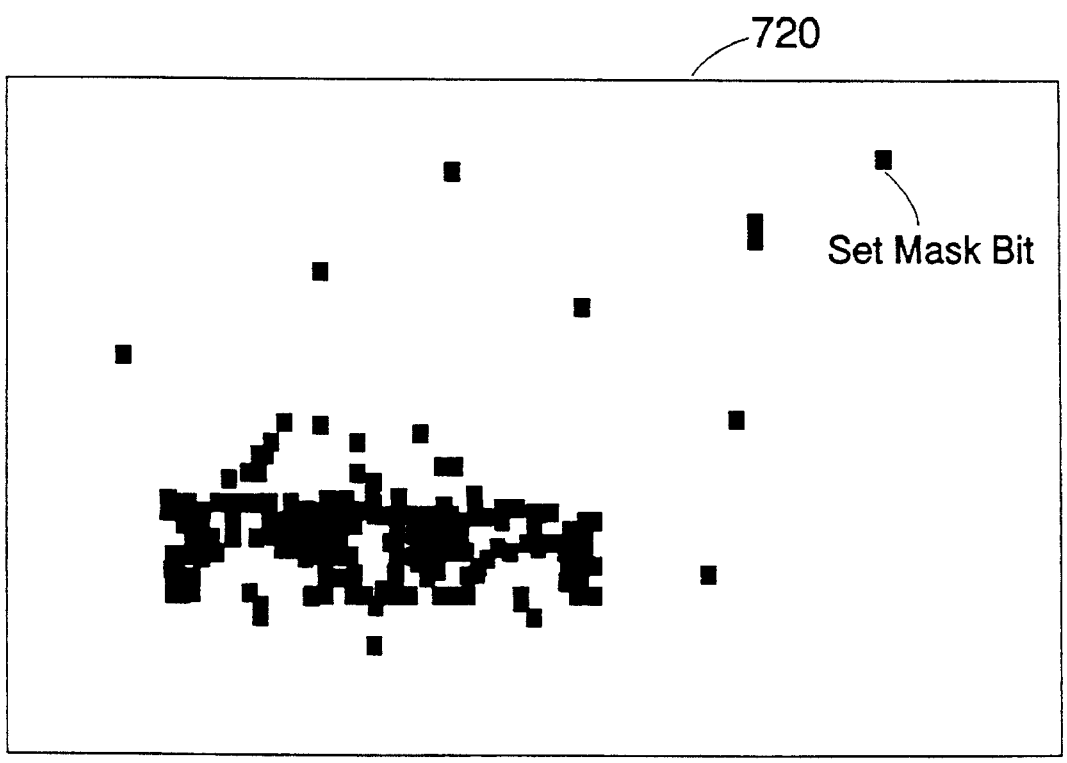
FIG. 13 is a schematic diagram of a global mask array for the image of FIG. 12.

In FIG. 13, the global mask array 720 corresponds to the original input image as shown in FIG. 12. The global mask array 720 illustrated is that obtained through comparison of a global motion vector which corresponds to the motion of the vehicle in FIG. 12 with the local motion vectors derived over the image as a whole. The black squares indicate "set" mask bits, ie mask bits, or array entries, which have been set to "1" indicating an association between the global motion vector and blocks located at corresponding positions in the input image. As expected, therefore, most of the mask bits corresponding to blocks containing part of the moving vehicle in FIG. 12 have been set in the mask array 720. However, it will be noted that, due to errors introduced, for example, through noise in the input signal, certain mask bits corresponding to blocks within the body of the moving vehicle have not been set. Equally, the global mask array 720 shows that certain mask bits corresponding to stationary portions of the input image have been set. To eliminate such errors in the global masks, each of the global masks stored in the mask memories 684 in FIG. 11 is subjected to a multiple-pass mask adjustment processing operation which is effectively a multiple-pass filtering operation performed by respective multiple-pass filters 686 each of which is connected to a corresponding mask array memory 684. The operations performed during the first pass of the filtering process will now be described with reference to FIG. 14.

Figure 14:
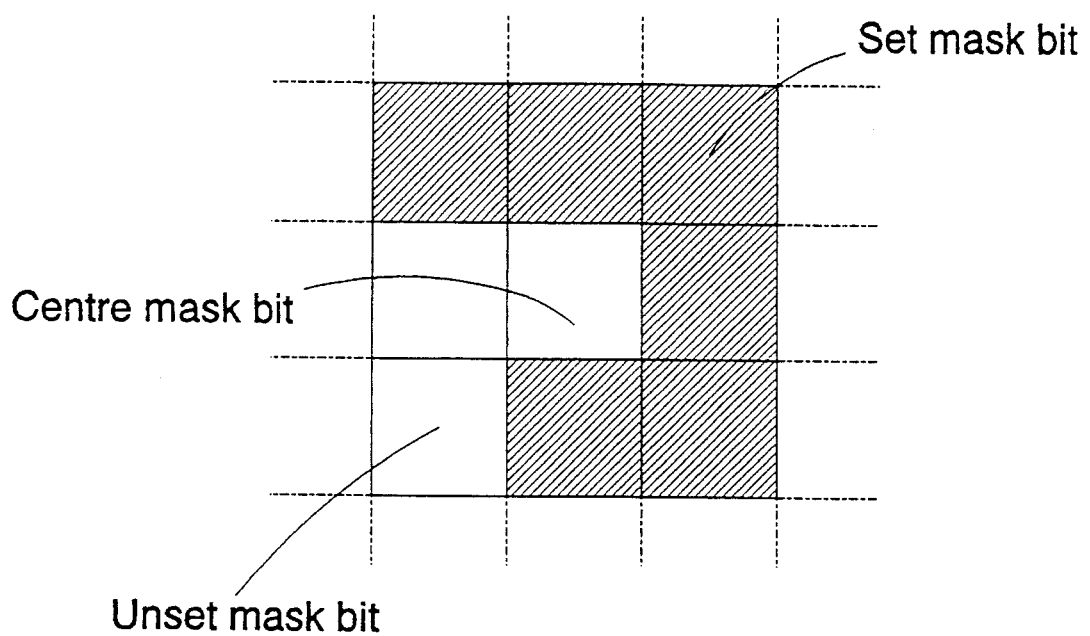
FIG. 14 illustrates a first pass of a mask filtering process.

FIG. 14 represents an enlarged portion of a global mask array such as the mask array 720 shown in FIG. 13 in which the dark squares represent set mask bits (value "1") and the white squares represent unset mask bits (value "0"). During the first pass of the filtering operation by a filter 686, each mask bit is considered together with the eight mask bits of a 3×3 group of mask bits surrounding the mask bit under test (the centre mask bit). For each 3×3 group, the number of set mask bits is determined and compared with a predetermined first-pass threshold. (In this example, the first-pass threshold may be set to 4 or 5 for example.) If the number of set mask bits exceeds the first-pass threshold, and the centre mask bit is not set (as is the case in the illustration of FIG. 14), then the centre mask bit is set.

Thus, if a sufficient number of mask bits surrounding a given unset mask bit are set, then the unset mask bit is set to "1" indicating a set mask bit. If the total number of set mask bits in the 3×3 group does not exceed the first-pass threshold, and the centre mask bit is not set, then the centre mask bit is unchanged.

Conversely, if the total number of set mask bits in the 3×3 group does not exceed the first-pass threshold, but the centre mask bit is set, then the centre mask bit is reset to "0" indicating an unset mask bit. If the total number of set mask bits in the 3×3 group exceeds the first-pass threshold and the centre mask bit is set, then the centre mask bit is unchanged.

The resetting of mask bits during the filtering process does not affect the remainder of that pass of the filtering operation. This is achieved by, for example, storing the filtered mask bits in a separate memory to the memory array from which the unfiltered mask bits are being read. Here, however, the filters are arranged to effect a sufficient delay between reading of unfiltered mask bits and output of filtered mask bits to prevent the fact that a mask bit has been reset from being taken into account during the remainder of that pass of the filtering operation.

It will be seen that, with a relatively high first-pass threshold of 4 or 5, the effect of the first-pass filtering operation on a global mask array such as that shown in FIG. 13 would be to "fill in" spurious gaps in the region of the mask array 720 corresponding to the vehicle in FIG. 12, and equally to eliminate the spurious set mask bits corresponding to stationary parts of the image of FIG. 12.

Thus, the effect of the first-pass filtering operation is to eliminate spurious errors in the original global mask array.

A side effect of the first-pass process, however, is that it "shrinks" the overall area of the group of set mask bits corresponding to the vehicle in FIG. 12. This is because, for set mask bits corresponding to an outer edge of the vehicle, the mask bits for blocks beyond the edge will not be set, and, if there is a sufficient number of these, the originally set mask bits corresponding to the edge of the vehicle will be reset to "0" To counter this effect, the filtering operation is repeated with the threshold for the additional pass or passes of the filtering operation being reduced. For example, after the first pass, the global masks produced by the first-pass filtering operation may be reapplied to the filters 686 with the predetermined threshold set to 2 or 3. This has the effect of "spreading" the areas of set mask bits in the global mask arrays to cover approximately the same area as in the original unfiltered mask arrays (without, of course, the spurious errors).

It is in fact preferred that the filtering operation is repeated a number of times (at the lower threshold) after the first pass to produce a slight overall spreading in the areas of set mask bits in the global masks as compared with the original unfiltered masks. In the present example, it is preferred that the filtering operation is repeated three, or possibly four, times at the lower threshold after the first-pass filtering operation at the higher threshold. This has the effect of extending the application of a given global vector to blocks just beyond those neighbouring a block for which the local vector was within the tolerance 685 of the global vector. Thus, sufficient additional passes of the filtering operation are performed to extend the application of the global vectors beyond blocks neighbouring those for which the corresponding mask bits were set in the unfiltered global masks.

Figure 15:
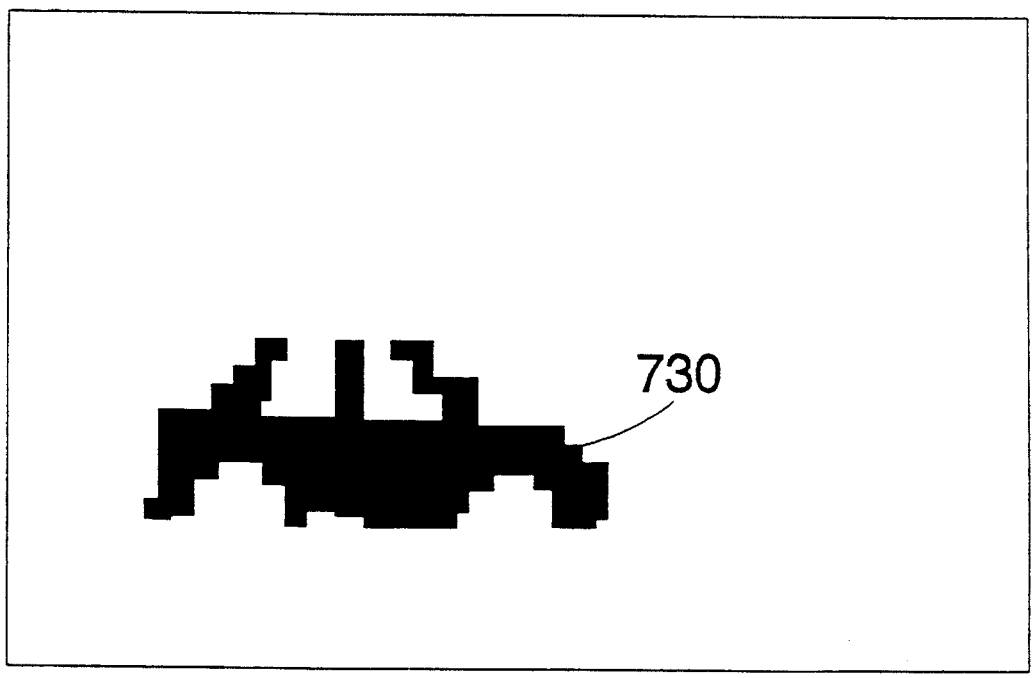
FIG. 15 illustrates a filtered global vector mask.

For the unfiltered global mask array 720 shown in FIG. 13, the final filtered global mask array 730 may be as shown in FIG. 15 for example, where it can be seen that the set mask bits indicate far more accurately the association between the global motion vector for the vehicle of FIG. 12 and the area of the vehicle within the image.

It will of course be appreciated that the filters 686 can be implemented as two-dimensional FIR (finite impulse response) 3×3 filters, with all coefficients set to unity, and the nine taps being connected to an adder the output of which forms an input to a comparator. The relevant threshold can be supplied to the other input of the comparator. The output of the comparator forms the filtered global mask array and can be reapplied to the filter input for the next pass with the threshold adjusted as necessary.

Accordingly, the filtered global mask arrays output by the filters 686, one for each global vector, are output by the mask array memory or global vector restricter 684.

Figure 16:
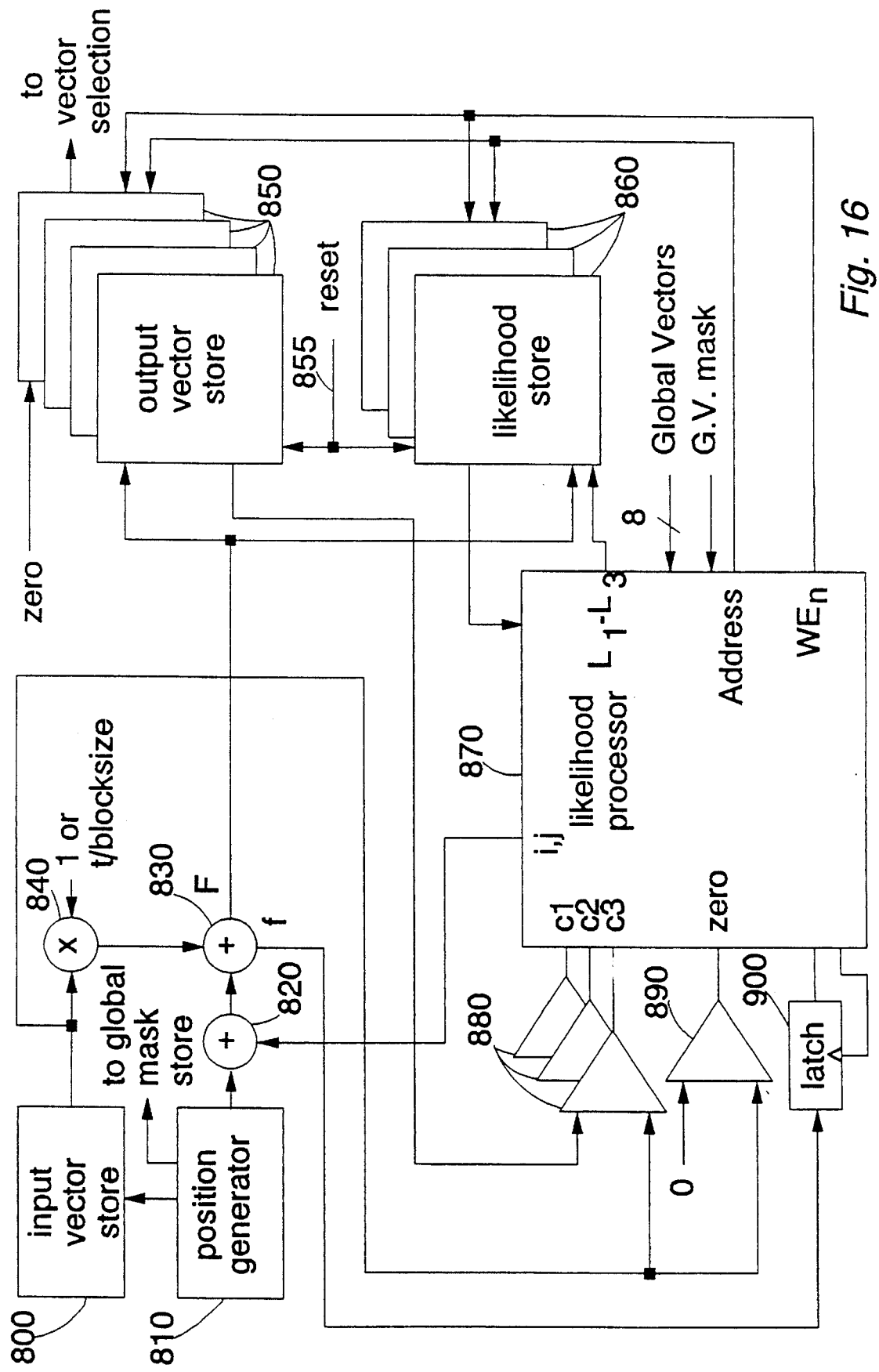
FIG. 16 is a schematic block diagram of a part of a motion vector reducer for assigning three motion vectors to each block of an output image.

FIG. 16 is a schematic block diagram of a further part of the motion vector reducer 420 which serves to choose three motion vectors to be assigned to each block of the output field.

FIG. 16 shows a input vector store 800, a position generator 810, a neighbour offset adder 820, a vector projection adder 830, a multiplier 840, an output vector store 850, a likelihood store 860, a likelihood processor 870, comparators 880, 890, and a latch 900.

The output vector store 850 can be considered to be three stores (referred to by the index 1, 2, 3) plus a store which always holds the zero motion vector. Similarly the likelihood store actually comprises three likelihood stores (referred to by the same index 1, 2, 3).

The operation of the apparatus of FIG. 16 will be described in detail below with reference to FIGS. 17 to 27. However, in basic terms, the apparatus of FIG. 16 (in particular the likelihood processor 870) operates to assign a respective "likelihood" to each global vector, each local vector and each projected local vector for each of the blocks of the output field. During this process, the three currently highest likelihoods for each block are stored in the likelihood store 860, and the motion vectors corresponding to those likelihood values are stored in the output vector store 850.

The position generator 810 generates an address counter which cycles through all possible block addresses in the input field (for each of which a motion vector is stored in the input vector store).

When the projected vectors are being considered, the multiplier 840 multiplies each motion vector by the temporal position of the output field (obtained from the time base changers of FIG. 6) divided by the number of pixels in one block. This is added, by the vector projection adder 830, to the current address output by the position generator 810 and a neighbour offset (i,j). The vector projection adder thus outputs an integer address F of the block intersected by the lower left corner of a notional search block projected along the vector direction, and a fractional address F (where $0 \leq f < 1$) representing the fractional part of the projected block position.

When likelihood values for all of the global vectors, the local vectors and the projected local vectors have been considered, the output vector store 850 can be considered to contain the three most likely vector choices for each block of the output field. These three most likely motion vectors, along with the zero motion vector are output by the output vector store 850, to be supplied to the vector selector 430. This basic operation is reflected in the flowchart of FIG. 17, which illustrates the steps performed by the apparatus of FIG. 16 in order to assign four motion vectors to each block of a particular output image.

Figure 17:
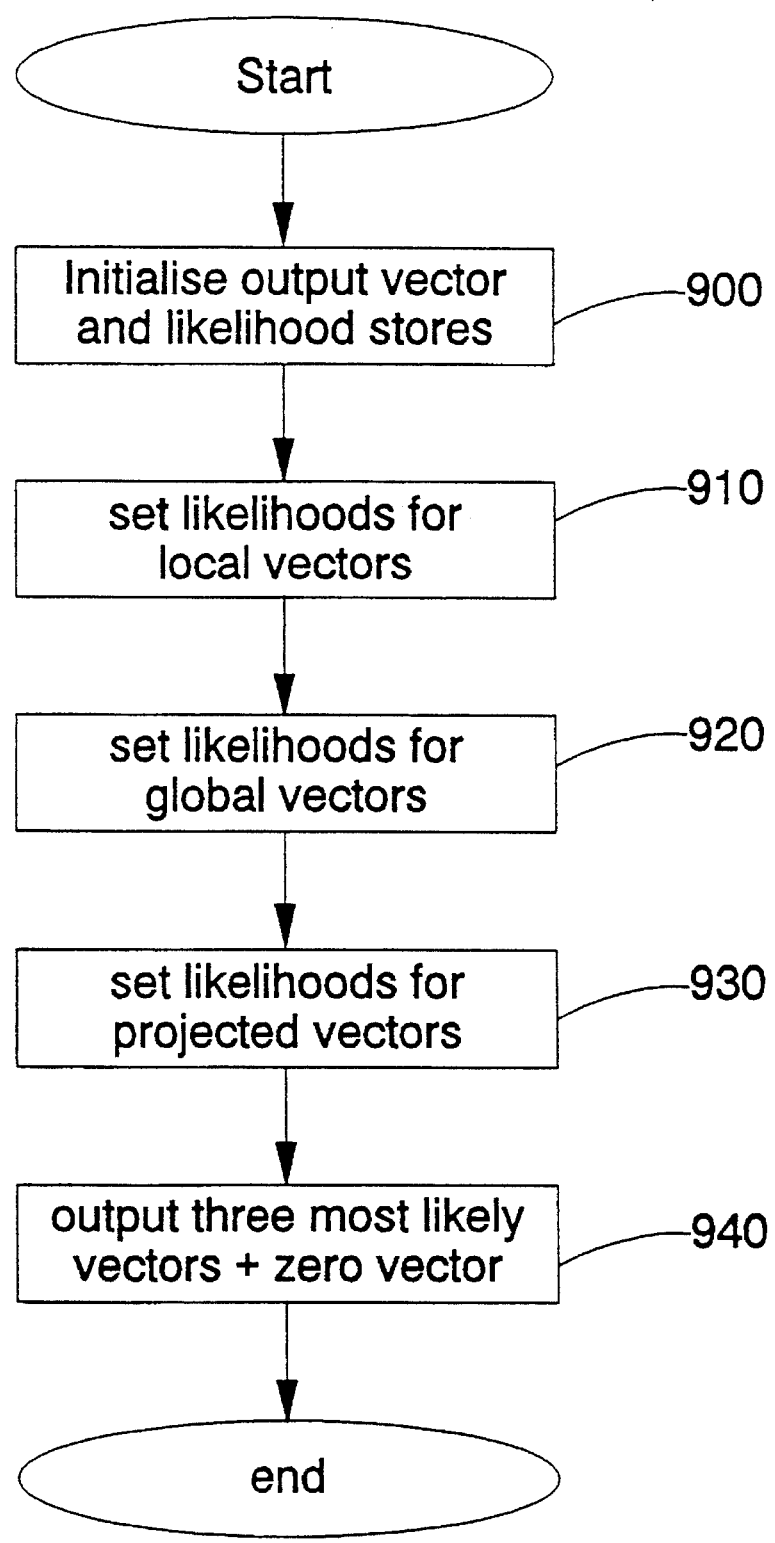
FIG. 17 is a flow chart illustrating the operation of the apparatus of FIG. 16.

Referring to FIGS. 16 and 17, at a step 900 the output vector store 850 and the likelihood store 860 are reset by means of a reset signal 855. This involves setting the motion vectors stored in the output vector store 850 to the zero motion vector and setting all of the likelihood values stored in the likelihood store 860 to zero.

At a step 910, the likelihood values for local motion vectors are determined and are stored in the likelihood store 860. This process will be described below with reference to FIG. 18.

At a step 920 the likelihood values for the global motion vectors are determined and stored. This process will be described below with reference to FIGS. 19 and 20.

At a step 930 the likelihood values for projected motion vectors are determined and stored. This process will be described below with reference to FIGS. 21 to 27.

Following the step 930 the likelihood values for all of the local motion vectors, the global motion vectors and the projected motion vectors have been considered, and the output vector store 850 can be considered to contain the three most likely vector choices for each block of the output field. Accordingly, the final step of FIG. 17 is the step 940 in which, for each block of the output field, the three motion vectors (plus the zero motion vector) stored in the output vector store 850 are supplied to the vector selector 430.

Figure 18:
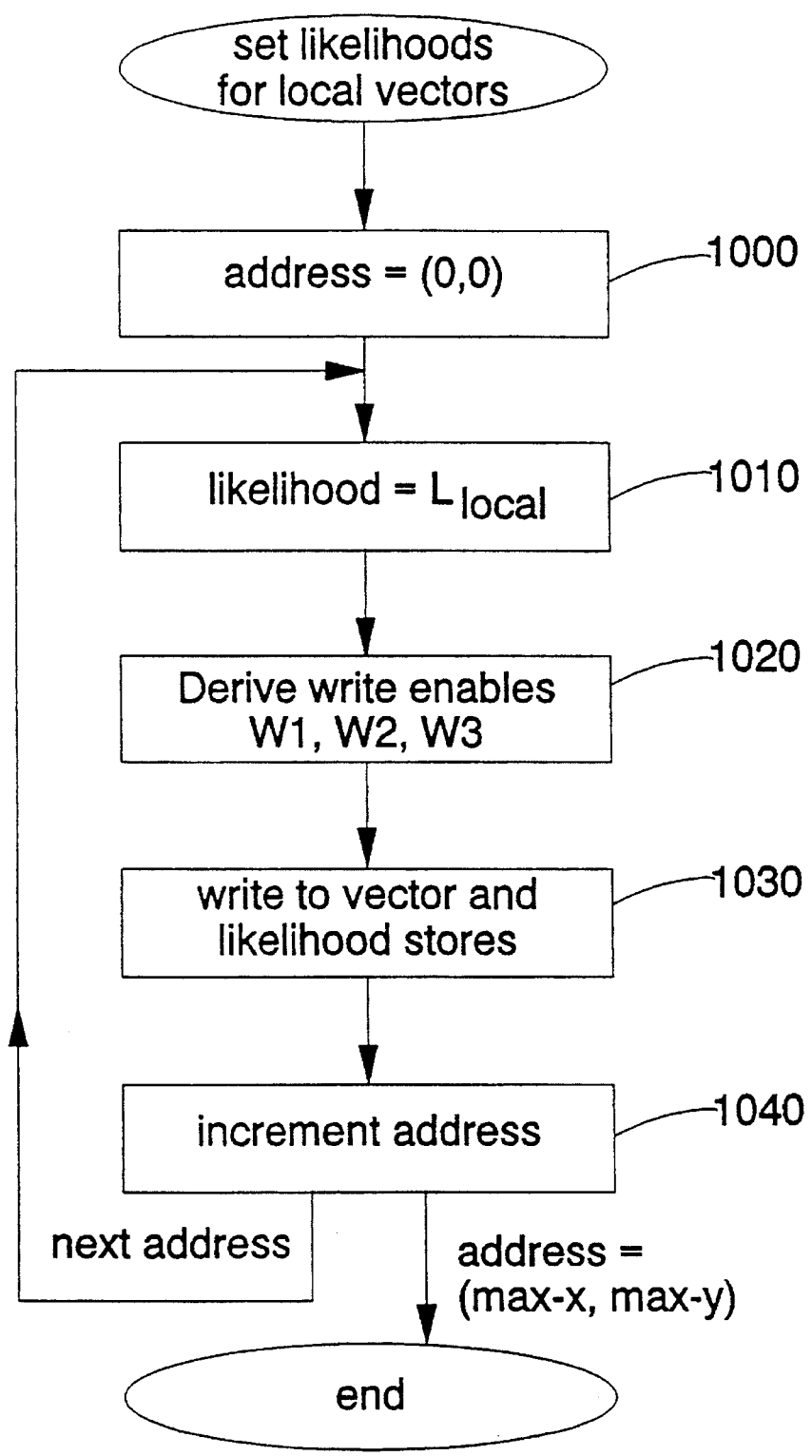
FIG. 18 is a flow chart illustrating in more detail one step of the flow chart of FIG. 17.

FIG. 18 is a flowchart showing in more detail the step 910 of FIG. 17, in which likelihood values corresponding to the local motion vectors are set. These likelihood values reflect a notional likelihood that a motion vector generated from a particular search block in the input field f0 will be suitable for use in interpolation of pixels of the block of the output field corresponding in position to the position of that search block.

In the following description, motion vectors stored in the input vector store 800 are addressed by respective horizontal and vertical coordinates which represent the horizontal and vertical position of a corresponding search block in the input field f0.

Referring to FIG. 18, at a step 1000, an address counter representing the address of a location in the output vector store and the likelihood store 860, is set to (0,0). Control is the passed to a loop comprising steps 1010, 1020, 1030 and 1040.

At the step 1010, a likelihood variable is set to a constant, namely $L_{local}$. At the step 1020, three write enable signals W1, W2 and W3 are derived to control writing of the likelihood value and the current local vector into the likelihood store 860 and the output vector store 850. The derivation of the three write enable signals is defined by the following Boolean equations:

$$W1 = (L_1 < L_{local}) \text{ AND } (((L_1 \leq L_2) \text{ AND } (L_1 \leq L_3)) \text{ OR } C_1) \text{ AND } \overline{Z} \text{ AND } \overline{C_2} \text{ AND } \overline{C_3}$$

$$W2 = (L_2 < L_{local}) \text{ AND } (((L_2 < L_3) \text{ AND } (L_2 < L_1)) \text{ OR } C_2) \text{ AND } \overline{Z} \text{ AND } \overline{C_1} \text{ AND } \overline{C_3}$$

$$W3 = (L_3 < L_{local}) \text{ AND } (((L_3 < L_2) \text{ AND } (L_3 < L_2)) \text{ OR } C_3) \text{ AND } \overline{Z} \text{ AND } \overline{C_1} \text{ AND } \overline{C_2}$$

In the above equations, the following variables and other terms are used:

W1, W2, W3: write enable signals for respective ones of the three output vector stores 850 and the three likelihood stores 860

L1, L2, L3: likelihood values stored in respective ones of the likelihood stores 860

C1, C2, C3: variable generated by the comparators 880 indicating whether the current motion vector equals one of the motion vectors stored in respective ones of the three output vector stores 850

Z: variable generated by the comparator 890 indicating whether the current motion vector equals the zero motion vector $L_{local}$: the constant likelihood value assigned to each local motion vector at the step 1010 described above In other words, the write enable W1 (which controls writing of the current motion vector into a first one of the likelihood stores and the output vector stores) is set if the following conditions are all met:

(i) the likelihood value currently held in likelihood store 1 must be less than $L_{local}$; and (ii) either the likelihood value held in likelihood store 1 is less than the likelihood value held in either of the other two likelihood stores, or the motion vector currently being considered is equal to the motion vector currently stored in the output vector store 1; and (iii) the current motion vector is not zero; and (iv) the current motion vector is not equal to the motion vector currently stored in either of the other two likelihood stores.

The other two write enables W2 and W3 are derived similarly, but the arrangement is such that if the above conditions apply to two or more write enables, then W1 will be set in preference to W2, and W2 will be set in preference to W3.

Since the operations illustrated in FIG. 18 take place immediately after the output vector store 850 and the likelihood store 860 have been reset (at the step 900), it is clear that W1 will always be set by the step 1020. This means that the step 1020 could be replaced by a simple step of 'set W1'. However, in the present embodiment, similar processing to that employed in the step 1020 is used again when the likelihood for global and projected vectors are set. The use of similar processing for the three processes simplifies the apparatus.

At the step 1030, the motion vector at the current address in the input vector store 800 is written to one of the output vector stores 850 under the control of the write enables W1, W2 and W3. At the same time, the likelihood set at the step 1010 is written to the same position in the corresponding one of the likelihood stores 860 (again under the control of the write enable signals W1, W2 and W3).

At the step 1040, the address value is incremented. If the address value then reaches (max-x, max-y), i.e. the highest possible values in the x and y directions, indicating that all available addresses have been considered, the process is terminated. If the maximum x and y values have not been reached, control is passed, with the new address value, to the step 1010.

Figure 19:
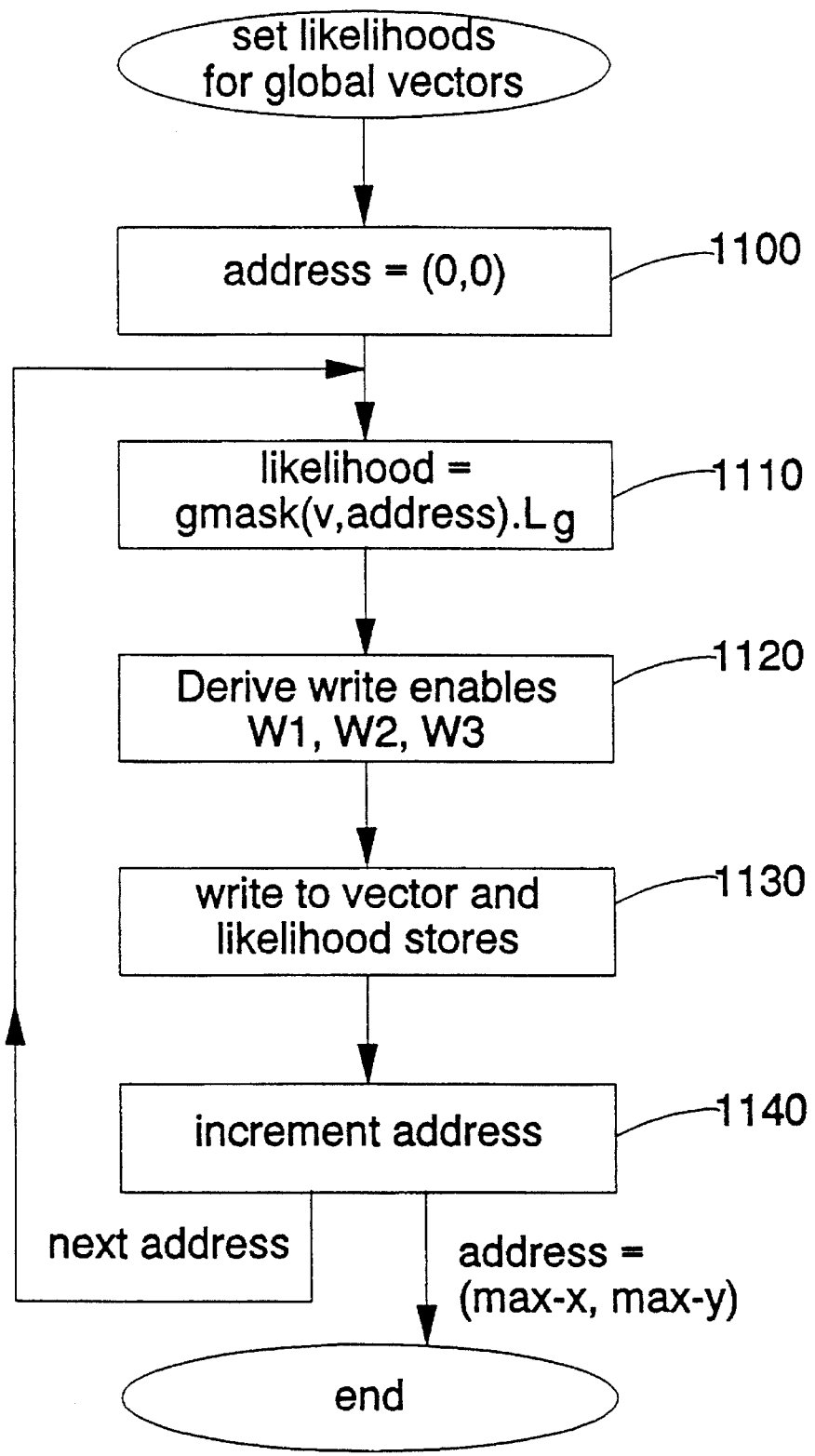
FIG. 19 is a flow chart illustrating in more detail one step of the flow chart of FIG. 17.
Figure 20:
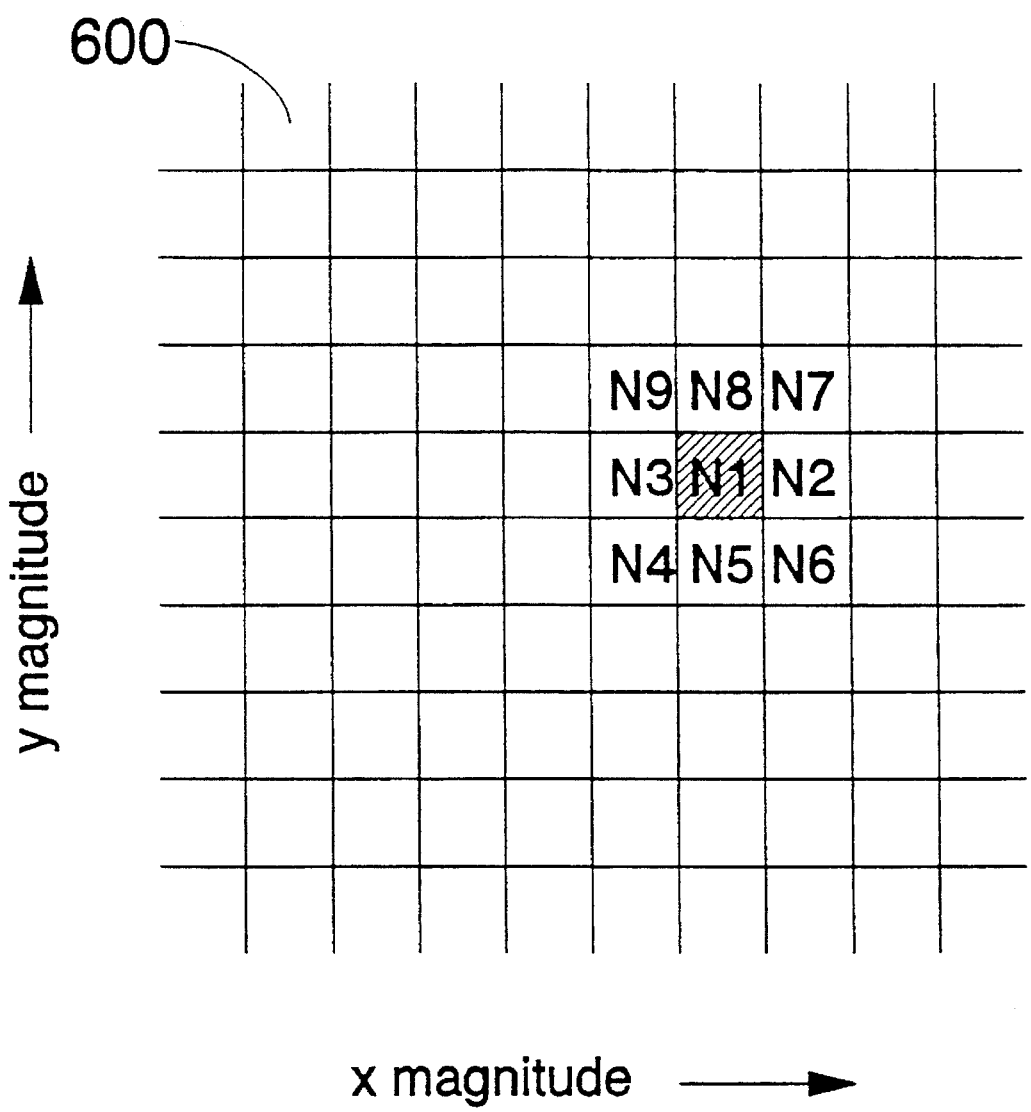
FIG. 20 illustrates a frequency array.

FIG. 19 is similar to FIG. 18, and illustrates the steps involved in performing the step 920 of FIG. 17, namely the setting of likelihood values for the global vectors.

The processing steps illustrated in FIG. 19 may individually be repeated eight times before moving on to the next step, in order that the eight global motion vectors are considered. Alternatively, the entire process of FIG. 19 can be repeated eight times.

In FIG. 19, the address counter representing the address of a location in the output vector store 850 and the likelihood store 860, is set to (0,0) at a step 1100. Control is then passed to a loop comprising steps 1110, 1120, 1130 and 1140.

At the step 1110, a likelihood value is generated for each global motion vector at the current address specified by the address counter. This likelihood value is derived as follows:

$$\text{likelihood} = \text{gmask}(\text{vector, address}).L_g$$

In the above equation, gmask(vector, address) represents the state of the global vector mask (e.g. the mask illustrated in FIG. 15) for that global vector at that position. The value $L_g$ is a constant.

In other words, if the global vector mask is set at the current address position for the global vector under consideration, then that vector is assigned a likelihood value of $L_g$ at that position. If the global vector mask bit is not set then the likelihood value is set to zero.

At the step 1120, the write enable signals W1, W2 and W3 are derived in a similar manner to that described above. The actual equations used are as follows:

$$W1 = (L_2 < L_g.\text{gmask}) \text{ AND } (((L_1 \leq L_2) \text{ AND } (L_1 \leq L_3)) \text{ OR } C_1)$$
$$\text{AND } \overline{Z} \text{ AND } \overline{C_2} \text{ AND } \overline{C_3}$$

$$W2 = (L_2 < L_g.\text{gmask}) \text{ AND } (((L_2 < L_3) \text{ AND } (L_2 < L_1)) \text{ OR } C_2) \text{ AND}$$
$$\overline{Z} \text{ AND } \overline{C_1} \text{ AND } \overline{C_2}$$

$$W3 = (L_3 < L_g.\text{gmask}) \text{ AND } (((L_3 < L_2) \text{ AND } (L_3 < L_1)) \text{ OR } C_3) \text{ AND}$$
$$\overline{Z} \text{ AND } \overline{C_1} \text{ AND } \overline{C_2}$$

At the step 1130, the motion vector at the current address in the input vector store 800 is written to one of the output vector stores under the control of the write enables W1, W2 and W3. At the same time, the likelihood set at the step 1110 is written to the same position in the corresponding one of the likelihood stores 860 (again under the control of the write enable signals W1, W2 and W3).

At the step 1140, the address value is incremented. If the address value then reaches (max-x, max-y), i.e. the highest possible values in the x and y directions, indicating that all available addresses have been considered, the process is terminated. If the maximum x and y values have not been reached, control is passed, with the new address value, to the step 1110.

In the description of FIG. 19 above, the global vector likelihood assigned at the step 1110 was dependent only on the state of the global vector mask bit at that position and a constant value $L_g$.

In another embodiment, the value $L_g$ could also be variable. This approach will now be described with reference to FIG. 20, which is a schematic illustration of part of the frequency array 600 of FIG. 10.

In the frequency array 600, a frequency value N stored at a position in the array represents the frequency of occurrence (across an entire pair of input fields) of a motion vector having a horizontal and vertical component corresponding to an x and a y address of that frequency value in the array. In fact, as described above, the eight global motion vectors are derived by detecting the eight highest frequency values in the frequency array 600, for which the respective motion vectors differ by more than a predetermined amount.

The frequency array 600 may also be used to detect a panning motion of the entire image. In this embodiment, the detection is made by summing the nine frequency values $N_1$ to $N_9$ forming a 3×3 grid around a frequency value $N_1$ representing the frequency of occurrence of one of the global vectors. In other words, the eight highest frequency values are detected as described above in order to derive the eight global vectors, and then the frequency values in a 3×3 grid surrounding each of those eight values are summed.

If the sum of the 3×3 group of frequency values for any one of the global motion vectors exceeds a predetermined proportion (e.g. one quarter) of the number of valid motion vectors detected across the entire pair of images, then this indicates that a large part of the image is moving with substantially the same motion (e.g. a camera pan is taking place). This implies that more weight should be given to the global vectors in the vector reduction process.

Accordingly, a pan flag is set if:

$$\sum_{n=1}^{9} N_n > \frac{\text{no. of valid vectors}}{4}$$

If the pan flag is set, this indicates that the likelihood values for the global motion vectors should be increased. This can be performed by increasing the value $L_g$ when the pan flag is set.

Figure 21:
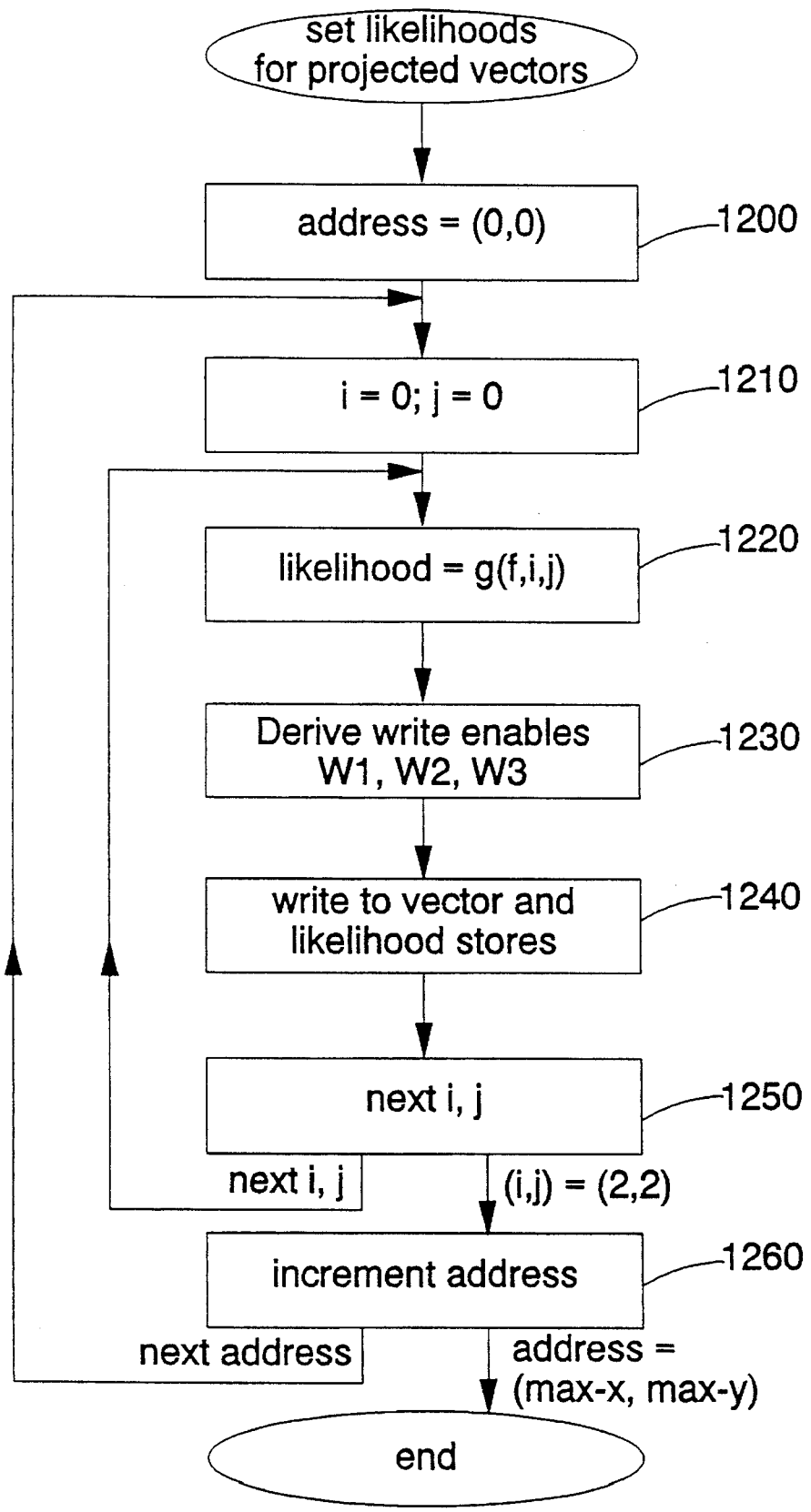
FIG. 21 is a flow chart illustrating in more detail one step of the flow chart of FIG. 17.

FIG. 21 is a flow chart representing the detailed steps required to perform the step 930 of FIG. 17, namely the setting of likelihood values for the projected local motion vectors.

In FIG. 21, the address counter representing the address of a location in the output vector store 850 and the likelihood store 860, is set to (0,0) at a step 1200. Control is passed to a step 1210 in which two offset counters i and j are set to respective values of (0,0).

Control is then passed to a loop comprising steps 1220, 1230, 1240 and 1250.

At the step 1220, a likelihood value is generated for each local motion vector at a projected address dependent on the current address specified by the address counter, the vector magnitude and direction, and the offset counters.

For the case when (i, j)=(0,0), this likelihood value is derived as follows:

$$g(f,0,0) = (1-f_x).(1-f_y)$$

where $f_x$ is the fractional part of the horizontal address component generated by the vector projection adder 830 and $f_y$ is the fractional part of the vertical address component generated by the vector projection adder 830.

The value of g(f,0,0) represents the area of intersection between a notional search block of the input field, projected along the current motion vector, and the block of the output image at the address specified by the integer part of the output of the vector projection adder 830. The area is expressed as a proportion of the area of the search block. This concept is illustrated schematically in FIG. 22, in which a shaded area 1300 represents the area of intersection between a search block 1310 projected along the current motion vector and a block 1320 of the output image at an address corresponding to the integer part of the output of the vector projection adder 830, namely $F_x$, $F_y$. The fractional values $f_x$ and $f_y$ are also illustrated in FIG. 22. It is apparent from FIG. 22 that the area 1300 is equal to a proportion $(1-f_x)(1-f_w)$ of the area of the block 1320.

In general, a projected search block will intersect four blocks of the output field in a 2×2 array. The positions of these intersected blocks with respect to the projected address are specified by the offset counters (i, j). FIG. 23 illustrates the area of intersection 1340 between the projected block 1310 and a block offset by (0, 1) i.e. 0 blocks horizontally and 1 block vertically. FIG. 24 illustrates the area of intersection 1350 between the projected block 1310 and a block offset by (1, 0) i.e. 1 block horizontally and 0 blocks vertically. Finally, FIG. 25 illustrates the area of intersection 1360 between the projected block 1310 and a block offset by (1, 1) i.e. 1 block horizontally and 1 block vertically.

The likelihood values to be assigned to these neighbouring blocks are determined by calculating the respective area of intersection as a proportion of the area of one block. However, in the particular case where a projected block exactly overlies a block of the output image (in one or both directions), it is necessary to calculate the likelihood values for neighbouring blocks as a proportion of the likelihood value for the intersected block.

The derivation of the three neighbouring likelihood values is therefore as follows:

$$
\begin{array}{lll}
g(f,0,1) & = & (1-f_x) \cdot f_y \quad \text{if } (1-f_x) \cdot f_y > 0 \\
 & = & g(f,0,0) \cdot T \quad \text{if } (1-f_x) \cdot f_y = 0 \\
g(f,1,0) & = & f_x \cdot (1-f_y) \quad \text{if } f_x \cdot (1-f_y) > 0 \\
 & = & g(f,0,0) \cdot T \quad \text{if } f_x \cdot (1-f_y) = 0 \\
g(f,1,1) & = & f_x \cdot f_y \quad \text{if } f_x \cdot f_y > 0 \\
 & = & g(f,0,0) \cdot T \quad \text{if } f_x \cdot f_y = 0
\end{array}
$$

In these equations, T is a constant (less than one).

Figure 26:
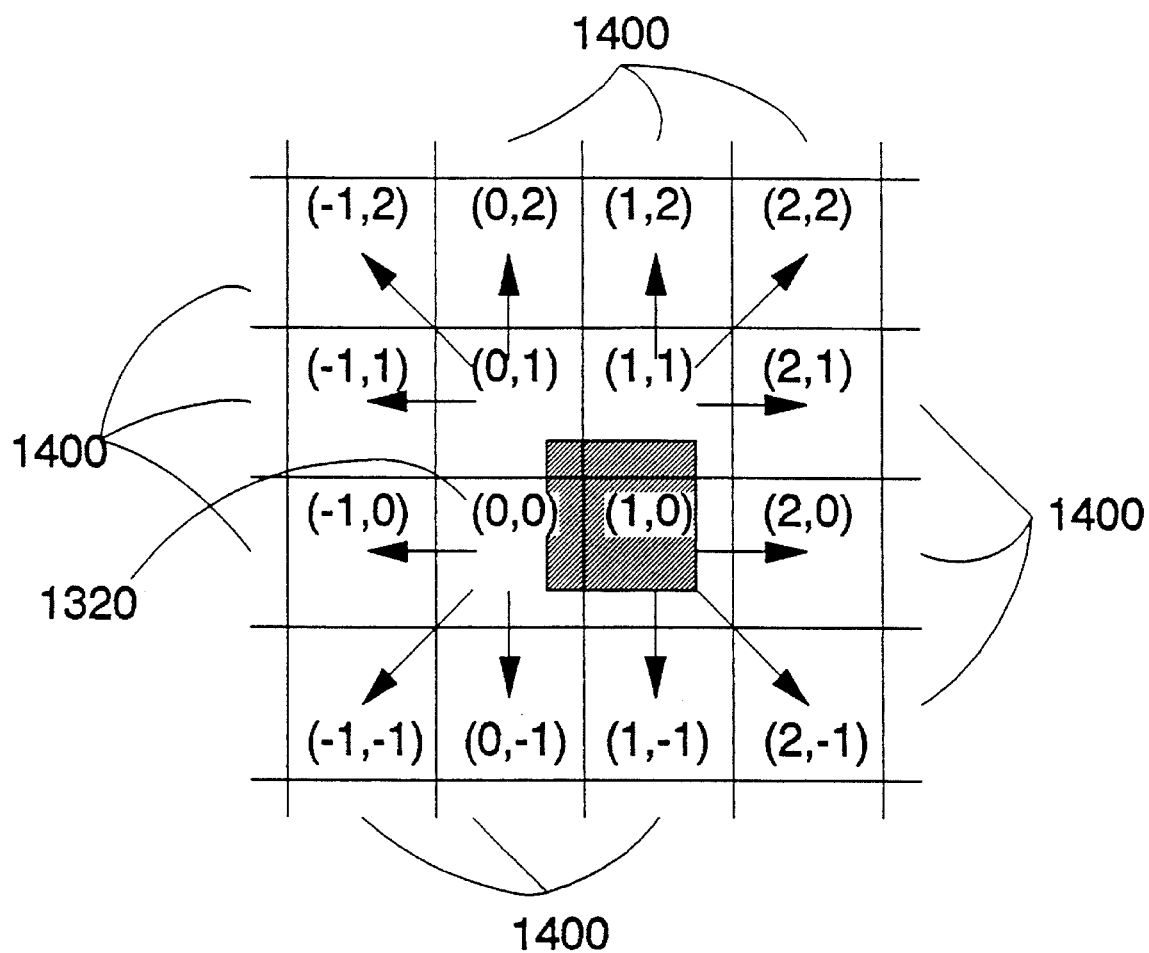

FIG. 26 is a schematic illustration illustrating the assignment of likelihood values to the twelve neighbouring blocks 1400 surrounding the 2×2 array of blocks shown in FIGS. 23 to 25.

Each of the blocks illustrated in FIG. 26 is shown with its respective (i, j) offset values with respect to the block (1320). For each block 1400, the arrow illustrates the block from which the likelihood value is modified to obtain the likelihood for that block 1400. In particular, the following equations are used to calculate the likelihood values to be assigned to the blocks 1400:

$$
\begin{array}{lll}
g(f,-1,-1) & = & g(f,0,0) \cdot T \\
g(f,-1,0) & = & g(f,0,0) \cdot T \\
g(f,-1,1) & = & g(f,0,1) \cdot T \\
g(f,-1,2) & = & g(f,0,1) \cdot T \\
g(f,0,-1) & = & g(f,0,0) \cdot T \\
g(f,0,2) & = & g(f,0,1) \cdot T \\
g(f,1,-1) & = & g(f,1,0) \cdot T \\
g(f,1,2) & = & g(f,1,1) \cdot T \\
g(f,2,-1) & = & g(f,1,0) \cdot T \\
g(f,2,0) & = & g(f,1,0) \cdot T \\
g(f,2,1) & = & g(f,1,1) \cdot T \\
g(f,2,2) & = & g(f,1,1) \cdot T
\end{array}
$$

Again, in these equations, T is a constant (less than one).

At the step 1230 in FIG. 21, the three write enable signals are derived for the current projected motion vector at the current projected address and the current offset values (i, j). The derivation of the write enable signals is as follows:

$$W1 = (L_1 < g(f,i,j)) \text{ AND } (((L_1 < L_2) \text{ AND } (L_1 < L_3)) \text{ OR } C_1) \text{ AND } \overline{Z} \text{ AND } \overline{C_2} \text{ AND } \overline{C_3}$$

$$W2 = (L_2 < g(f,i,j)) \text{ AND } (((L_2 < L_3) \text{ AND } (L_2 < L_1)) \text{ OR } C_2) \text{ AND } \overline{Z} \text{ AND } \overline{C_1} \text{ AND } \overline{C_3}$$

$$W3 = (L_3 < g(f,i,j)) \text{ AND } (((L_3 < L_2) \text{ AND } (L_3 < L_1)) \text{ OR } C_3) \text{ AND } \overline{Z} \text{ AND } \overline{C_1} \text{ AND } \overline{C_2}$$

In response to the write enable signals W1, W2 and W3, the current vector may be written to the output vector store 850 and the likelihood written to the likelihood store 860 at an address equal to the integer part of the current output of the vector projection adder 830, i.e. the projected address of the current vector plus the offset values (i,j).

At the step 1250 a next set of the offset values (i,j) is selected, and control is returned to the step 1220.

The effect of the interdependencies of the above calculations is that the offset counters i and j cannot be incremented in a simple manner from (−1, −1) to (2, 2) at the step 1250 in order to calculate all of the above equations at the step 1220. Instead, the step 1250 changes the values of (i, j) in the following sequence, which starts at (0, 0) and terminates at (2, 2):

| | | | |
|---|---|---|---|
| (0, 0) | (0, 1) | (1, 0) | (1, 1) |
| (−1, −1) | (−1, 0) | (−1, 1) | (−1, 2) |
| (0, −1) | (0, 2) | | |
| (1, −1) | (1, 2) | | |
| (2, −1) | (2, 0) | (2, 1) | (2, 2) |

If, at the step 1250, all of the offset values have been used, control is passed to a step 1260 at which the address counter is incremented. Control is then returned to the step 1210, unless all possible address values have been considered (in which case the process terminates).

Figure 27:
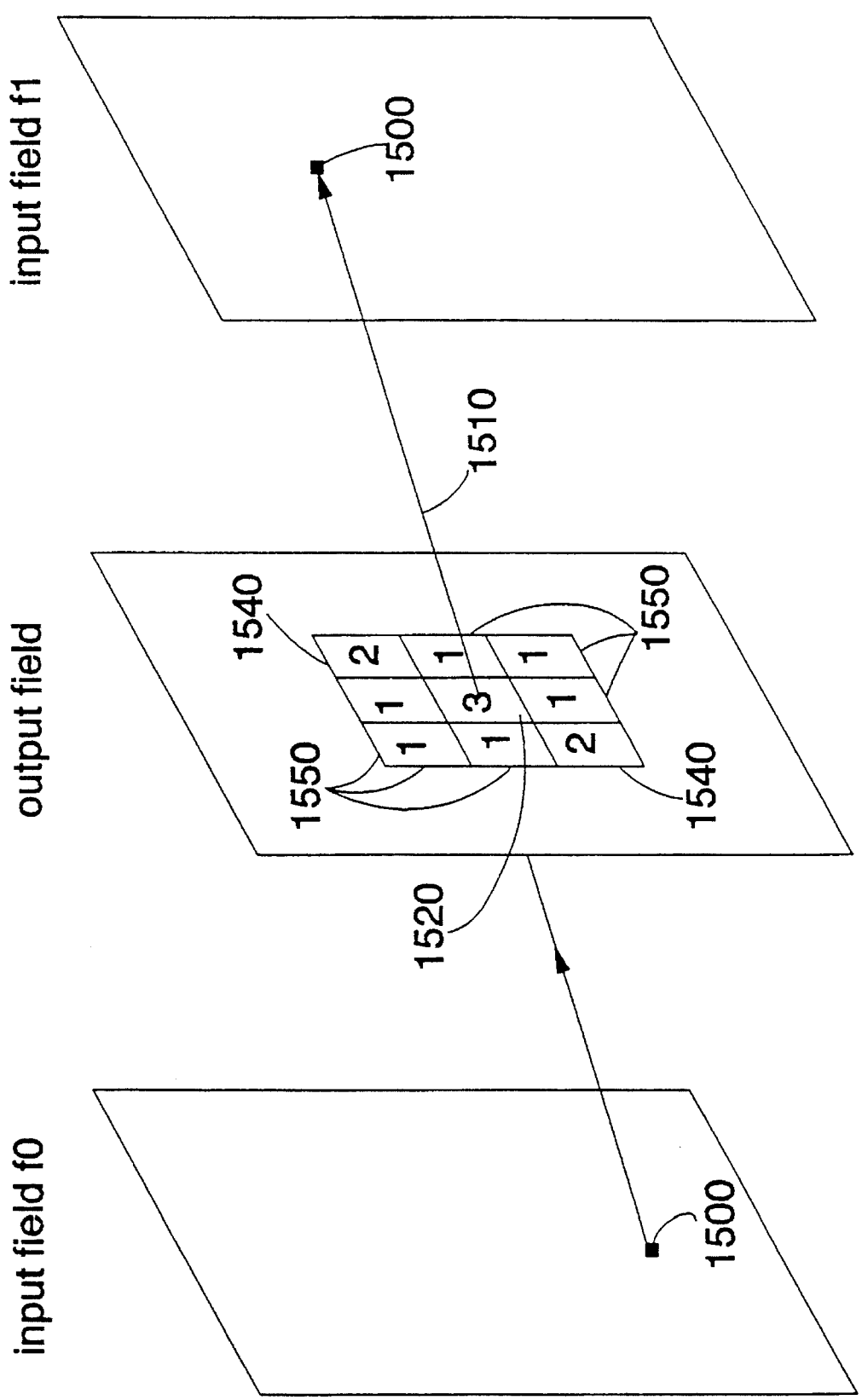
FIG. 27 illustrates the operation of a second embodiment of the present invention.

FIG. 27 is a schematic diagram illustrating another possible mode of operation of the apparatus of FIG. 16 to perform the step 930 (setting likelihoods for projected vectors) of FIG. 17. The remaining steps of FIG. 17 may be performed as already described.

In FIG. 27, the motion of an object 1500 between two consecutive input fields f0 and f1 is represented by a motion vector 1510. The projection of the motion vector 1510 is determined in the same way as shown in FIG. 16, to identify a block 1920 of the output field 1530 intersected by the motion vector 1510.

The motion vector 1510 is then assigned to the block 1520 with a likelihood of (say) 3, and to adjacent (neighbouring) blocks with a reduced likelihood which varies in accordance with the direction of the motion vector. In particular, neighbouring blocks at the top right and lower left positions with respect to the intersected block are assigned a higher likelihood value than other neighbouring blocks.

The effect of the above variation in assigned likelihood values is that blocks 1540 lying broadly along the direction of the motion vector are given a higher likelihood for that motion vector than blocks 1550 not lying along the direction of the motion vector. The determination of whether a block lies along the direction of the motion vector could be established as follows:

a) if the motion vector has a positive horizontal component and a positive vertical component, then the blocks adjacent to the intersected block in below left and above right positions are given a higher likelihood value;

b) if the motion vector has a positive horizontal component and a negative vertical component, then the blocks adjacent to the intersected block in below right and above left positions are given a higher likelihood value;

c) if the motion vector has a non-zero horizontal component and a substantially zero vertical component, then the blocks horizontally adjacent to the intersected block are given a higher likelihood value; and d) if the motion vector has a non-zero vertical component and a substantially zero horizontal component, then the blocks vertically adjacent to the intersected block are given a higher likelihood value.

The determination of whether a motion vector has a zero or non-zero component in a particular direction can employ a range of values to compensate for the effects of random noise on the generation of the motion vectors. For example, a motion vector having a component of up to (say) ±5 pixels may be taken as having a zero component in that direction.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Motion compensated video signal processing apparatus for interpolating an output image of an output video signal from a corresponding pair of temporally adjacent input images of an input video signal, said video signal processing apparatus comprising:

means for generating a plurality of local motion vectors to represent image motion of respective search blocks of one input image of said pair between that image and the other image of said pair;

means for detecting blocks of said output image pointed to by each of said local motion vectors;

means for assigning a group of motion vectors to each block of said output image, said group being selected from a set of motion vectors comprising at least those local motion vectors pointing to that block of said output image, said means for assigning comprising (i) means for deriving likelihood values for each block of said output image, said likelihood values for each block being indicative of the suitability of each motion vector in the respective set of motion vectors for use in interpolation of pixels of that block, and (ii) means for detecting a predetermined number of motion vectors having the highest likelihood values from the respective set of motion vectors for each block of said output image; and a motion compensated interpolator for interpolating pixels of each block of said output image from said pair of input images, using a motion vector from said group assigned to that block;

wherein for each block of said output image, said local motion vector for a corresponding search block has a likelihood value equal to a predetermined constant value.

2. Motion compensated video signal processing apparatus for interpolating an output image of an output video signal from a corresponding pair of temporally adjacent input images of an input video signal, said video signal processing apparatus comprising:

means for generating a plurality of local motion vectors to represent image motion of respective search blocks of one input image of said pair between that image and the other image of said pair;

means for detecting blocks of said output image pointed to by each of said local motion vectors;

means for assigning a group of motion vectors to each block of said output image, said group being selected from a set of motion vectors comprising at least those local motion vectors pointing to that block of said output image, said means for assigning comprising (i) means for deriving likelihood values for each block of said output image, said likelihood values for each block being indicative of the suitability of each motion vector in the respective set of motion vectors for use in interpolation of pixels of that block, and (ii) means for detecting a predetermined number of motion vectors having the highest likelihood values from the respective set of motion vectors for each block of said output image; and a motion compensated interpolator for interpolating pixels of each block of said output image from said pair of input images, using a motion vector from said group assigned to that block;

wherein for each block of said output image, a likelihood value for a local motion vector pointing to that block is proportional to an area of intersection between that block and a search block corresponding to that motion vector projected in the direction of that motion vector.

3. Motion compensated video signal processing apparatus for interpolating an output image of an output video signal from a corresponding pair of temporally adjacent input images of an input video signal, said video signal processing apparatus comprising:

means for generating a plurality of local motion vectors to represent image motion of respective search blocks of one input image of said pair between that image and the other image of said pair;

means for detecting blocks of said output image pointed to by each of said local motion vectors;

means for assigning a group of motion vectors to each block of said output image, said group being selected from a set of motion vectors comprising at least those local motion vectors pointing to that block of said output image, said means for assigning comprising (i) means for deriving likelihood values for each block of said output image, said likelihood values for each block being indicative of the suitability of each motion vector in the respective set of motion vectors for use in interpolation of pixels of that block, and (ii) means for detecting a predetermined number of motion vectors having the highest likelihood values from the respective set of motion vectors for each block of said output image; and a motion compensated interpolator for interpolating pixels of each block of said output image from said pair of input images, using a motion vector from said group assigned to that block;

wherein said set of motion vectors for each block of said output image comprises those local motion vectors pointing to blocks of said output image adjacent to that block of said output image; and wherein for each block of said output image, a likelihood value for a local motion vector pointing to an adjacent block of said output image is proportional to an area of intersection between a first mentioned block of said output image and a search block corresponding to said motion vector projected in the direction of said motion vector.

4. Motion compensated video signal processing apparatus for interpolating an output image of an output video signal from a corresponding pair of temporally adjacent input images of an input video signal, said video signal processing apparatus comprising:

means for generating a plurality of local motion vectors to represent image motion of respective search blocks of one input image of said pair between that image and the other image of said pair;

means for detecting blocks of said output image pointed to by each of said local motion vectors;

means for assigning a group of motion vectors to each block of said output image, said group being selected from a set of motion vectors comprising at least those local motion vectors pointing to that block of said output image;

a motion compensated interpolator for interpolating pixels of each block of said output image from said pair of input images, using a motion vector from said group assigned to that block;

means for deriving global motion vectors comprising a plurality of distinct motion vectors selected from the most common of said plurality of local motion vectors; and means for deriving a global vector mask for each global motion vector, said mask for each global motion vector being indicative of blocks of said output image for which a corresponding search block has a local motion vector within a predetermined tolerance of that global motion vector.

5. Motion compensated video signal processing apparatus for interpolating an output image of an output video signal from a corresponding pair of temporally adjacent input images of an input video signal, said video signal processing apparatus comprising:

means for generating a plurality of local motion vectors to represent image motion of respective search blocks of one input image of said pair between that image and the other image of said pair;

means for detecting blocks of said output image pointed to by each of said local motion vectors;

means for assigning a group of motion vectors to each block of said output image, said group being selected from a set of motion vectors comprising at least those local motion vectors pointing to that block of said output image, said means for assigning comprising (i) means for deriving likelihood values for each block of said output image, said likelihood values for each block being indicative of the suitability of each motion vector in the respective set of motion vectors for use in interpolation of pixels of that block, and (ii) means for detecting a predetermined number of motion vectors having the highest likelihood values from the respective set of motion vectors for each block of said output image;

a motion compensated interpolator for interpolating pixels of each block of said output image from said pair of input images, using a motion vector from said group assigned to that block; and means for deriving global motion vectors and a global vector mask for each global motion vector, said mask for each global motion vector being indicative of blocks of said output image for which a corresponding search block has a local motion vector within a predetermined tolerance of that global motion vector;

wherein for each block of said output image, a likelihood value for each global motion vector is dependent on said respective global vector mask.

6. Motion compensated video signal processing apparatus for interpolating an output image of an output video signal from a corresponding pair of temporally adjacent input images of an input video signal, said video signal processing apparatus comprising:

means for generating a plurality of local motion vectors to represent image motion of respective search blocks of one input image of said pair between that image and the other image of said pair;

means for detecting blocks of said output image pointed to by each of said local motion vectors;

means for assigning a group of motion vectors to each block of said output image, said group being selected from a set of motion vectors comprising at least those local motion vectors pointing to that block of said output image;

a motion compensated interpolator for interpolating pixels of each block of said output image from said pair of input images, using a motion vector from said group assigned to that block;

means for deriving global motion vectors comprising a plurality of distinct motion vectors selected from the most common of said plurality of local motion vectors; and means for detecting whether one or more of said global motion vectors is substantially equal to at least a predetermined proportion of said local motion vectors, thereby detecting a panning motion of said input images.

7. Motion compensated video signal processing apparatus for interpolating an output image of an output video signal from a corresponding pair of temporally adjacent input images of an input video signal, said video signal processing apparatus comprising:

means for generating a plurality of local motion vectors to represent image motion of respective search blocks of one input image of said pair between that image and the other image of said pair;

means for detecting blocks of said output image pointed to by each of said local motion vectors;

means for assigning a group of motion vectors to each block of said output image, said group being selected from a set of motion vectors comprising at least those local motion vectors pointing to that block of said output image, said means for assigning comprising (i) means for deriving likelihood values for each block of said output image, said likelihood values for each block being indicative of the suitability of each motion vector in the respective set of motion vectors for use in interpolation of pixels of that block, and (ii) means for detecting a predetermined number of motion vectors having the highest likelihood values from the respective set of motion vectors for each block of said output image;

a motion compensated interpolator for interpolating pixels of each block of said output image from said pair of input images, using a motion vector from said group assigned to that block; and means for detecting whether one or more global motion vectors is substantially equal to at least a predetermined proportion of said local motion vectors, thereby detecting a panning motion of said input images;

wherein for each block of said output image, a likelihood value for each global motion vector is dependent on whether a panning motion of said input images is detected.

8. Apparatus according to claim 1, in which said input images comprise successive fields of an input interlaced video signal.

9. Apparatus according to claim 1, in which said output image comprises a field of an output interlaced video signal.

10. Television standards conversion apparatus comprising apparatus according to claim 1.

* * * * *